US010402340B2

(12) United States Patent
Lea

(10) Patent No.: US 10,402,340 B2
(45) Date of Patent: Sep. 3, 2019

(54) MEMORY ARRAY PAGE TABLE WALK

(71) Applicant: Micron Technology, Inc., Boise, ID (US)

(72) Inventor: Perry V. Lea, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/437,982

(22) Filed: Feb. 21, 2017

(65) Prior Publication Data

US 2018/0239712 A1 Aug. 23, 2018

(51) Int. Cl.

| | |
|---|---|
| ***G06F 12/0864*** | (2016.01) |
| ***G06F 12/1009*** | (2016.01) |
| ***G06F 12/1027*** | (2016.01) |
| ***G06F 12/1045*** | (2016.01) |

(52) U.S. Cl.

CPC ...... *G06F 12/1009* (2013.01); *G06F 12/0864* (2013.01); *G06F 12/1027* (2013.01); *G06F 12/1045* (2013.01); *G06F 2212/1016* (2013.01); *G06F 2212/1028* (2013.01);

(Continued)

(58) Field of Classification Search

CPC ............... G06F 3/00; G06F 3/06–0689; G06F 9/00–548; G06F 12/00–0692; G06F 12/08–0864; G06F 12/0866–1009; G06F 12/1018–1045; G06F 12/1054–16; G06F 13/00–4295; G06F 17/30–30997; G06F 21/00–88; G06F 2003/0691–0698; G06F 2206/00–20; G06F 2209/00–549; G06F 2212/00–7211; G06F 2216/00–17; G06F 2221/00–2153

See application file for complete search history.

(56) References Cited

U.S. PATENT DOCUMENTS

| | | | |
|---|---|---|---|
| 4,380,046 | A | 4/1983 | Fung |
| 4,435,792 | A | 3/1984 | Bechtolsheim |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

Definition cache memory; Rouse, Margaret; May 2018; retrieved from https://searchstorage.techtarget.com/definition/cache-memory on May 28, 2018 (Year: 2018).*

(Continued)

*Primary Examiner* — Daniel C. Chappell

(74) *Attorney, Agent, or Firm* — Brooks, Cameron & Huebsch, PLLC

(57) ABSTRACT

An example memory array page table walk can include using an array of memory cells configured to store a page table. The page table walk can include using sensing circuitry coupled to the array. The page table walk can include using a controller coupled to the array. The controller can be configured to operate the sensing circuitry to determine a physical address of a portion of data by accessing the page table in the array of memory cells. The controller can be configured to operate the sensing circuitry to cause storing of the portion of data in a buffer.

24 Claims, 9 Drawing Sheets

(52) U.S. Cl.
CPC .. *G06F 2212/651* (2013.01); *G06F 2212/652* (2013.01); *G06F 2212/684* (2013.01)

(56) References Cited

U.S. PATENT DOCUMENTS 4,435,793 A * 3/1984 Ochii .................... G11C 5/063 365/190
4,727,474 A 2/1988 Batcher
4,843,264 A 6/1989 Galbraith
4,958,378 A 9/1990 Bell
4,977,542 A 12/1990 Matsuda et al.
5,023,838 A 6/1991 Herbert
5,034,636 A 7/1991 Reis et al.
5,201,039 A 4/1993 Sakamura
5,210,850 A 5/1993 Kelly et al.
5,253,308 A 10/1993 Johnson
5,276,643 A 1/1994 Hoffman et al.
5,325,519 A 6/1994 Long et al.
5,367,488 A 11/1994 An
5,379,257 A 1/1995 Matsumura et al.
5,386,379 A 1/1995 Ali-Yahia et al.
5,398,213 A 3/1995 Yeon et al.
5,440,482 A 8/1995 Davis
5,446,690 A 8/1995 Tanaka et al.
5,473,576 A 12/1995 Matsui
5,481,500 A 1/1996 Reohr et al.
5,485,373 A 1/1996 Davis et al.
5,506,811 A 4/1996 McLaury
5,615,404 A 3/1997 Knoll et al.
5,638,128 A 6/1997 Hoogenboom
5,638,317 A 6/1997 Tran
5,654,936 A 8/1997 Cho
5,678,021 A 10/1997 Pawate et al.
5,680,565 A * 10/1997 Glew .................... G06F 9/3834 711/205
5,724,291 A 3/1998 Matano
5,724,366 A 3/1998 Furutani
5,751,987 A 5/1998 Mahant-Shetti et al.
5,787,458 A 7/1998 Miwa
5,854,636 A 12/1998 Watanabe et al.
5,867,429 A 2/1999 Chen et al.
5,870,504 A 2/1999 Nemoto et al.
5,915,084 A 6/1999 Wendell
5,935,263 A 8/1999 Keeth et al.
5,986,942 A 11/1999 Sugibayashi
5,991,209 A 11/1999 Chow
5,991,785 A 11/1999 Alidina et al.
6,005,799 A 12/1999 Rao
6,009,020 A 12/1999 Nagata
6,092,186 A 7/2000 Betker et al.
6,122,211 A 9/2000 Morgan et al.
6,125,071 A 9/2000 Kohno et al.
6,134,164 A 10/2000 Lattimore et al.
6,147,514 A 11/2000 Shiratake
6,151,244 A 11/2000 Fujino et al.
6,157,578 A 12/2000 Brady
6,163,862 A 12/2000 Adams et al.
6,166,942 A 12/2000 Vo et al.
6,172,918 B1 1/2001 Hidaka
6,175,514 B1 1/2001 Henderson
6,181,698 B1 1/2001 Hariguchi
6,208,544 B1 3/2001 Beadle et al.
6,226,215 B1 5/2001 Yoon
6,301,153 B1 10/2001 Takeuchi et al.
6,301,164 B1 10/2001 Manning et al.
6,304,477 B1 10/2001 Naji
6,389,507 B1 5/2002 Sherman
6,418,498 B1 7/2002 Martwick
6,466,499 B1 10/2002 Blodgett
6,510,098 B1 1/2003 Taylor
6,563,754 B1 5/2003 Lien et al.
6,578,058 B1 6/2003 Nygaard
6,731,542 B1 5/2004 Le et al.
6,754,746 B1 6/2004 Leung et al.
6,768,679 B1 7/2004 Le et al.
6,807,614 B2 10/2004 Chung
6,816,422 B2 11/2004 Hamade et al.
6,819,612 B1 11/2004 Achter
6,894,549 B2 5/2005 Eliason
6,943,579 B1 9/2005 Hazanchuk et al.
6,948,056 B1 9/2005 Roth
6,950,771 B1 9/2005 Fan et al.
6,950,898 B2 9/2005 Merritt et al.
6,956,770 B2 10/2005 Khalid et al.
6,961,272 B2 11/2005 Schreck
6,965,648 B1 11/2005 Smith et al.
6,985,394 B2 1/2006 Kim
6,987,693 B2 1/2006 Cernea et al.
7,020,017 B2 3/2006 Chen et al.
7,028,170 B2 4/2006 Saulsbury
7,045,834 B2 5/2006 Tran et al.
7,054,178 B1 5/2006 Shiah et al.
7,061,817 B2 6/2006 Raad et al.
7,079,407 B1 7/2006 Dimitrelis
7,173,857 B2 2/2007 Kato et al.
7,187,585 B2 3/2007 Li et al.
7,196,928 B2 3/2007 Chen
7,260,565 B2 8/2007 Lee et al.
7,260,672 B2 8/2007 Garney
7,372,715 B2 5/2008 Han
7,400,532 B2 7/2008 Aritome
7,406,494 B2 7/2008 Magee
7,447,720 B2 11/2008 Beaumont
7,454,451 B2 11/2008 Beaumont
7,457,181 B2 11/2008 Lee et al.
7,535,769 B2 5/2009 Cernea
7,546,438 B2 6/2009 Chung
7,562,198 B2 7/2009 Noda et al.
7,574,466 B2 8/2009 Beaumont
7,602,647 B2 10/2009 Li et al.
7,663,928 B2 2/2010 Tsai et al.
7,685,365 B2 3/2010 Rajwar et al.
7,692,466 B2 4/2010 Ahmadi
7,752,417 B2 * 7/2010 Manczak ............ G06F 11/3466 711/209
7,791,962 B2 9/2010 Noda et al.
7,796,453 B2 9/2010 Riho et al.
7,805,587 B1 9/2010 Van Dyke et al.
7,808,854 B2 10/2010 Takase
7,827,372 B2 11/2010 Bink et al.
7,869,273 B2 1/2011 Lee et al.
7,898,864 B2 3/2011 Dong
7,924,628 B2 4/2011 Danon et al.
7,937,535 B2 5/2011 Ozer et al.
7,957,206 B2 6/2011 Bauser
7,979,667 B2 7/2011 Allen et al.
7,996,749 B2 8/2011 Ding et al.
8,042,082 B2 10/2011 Solomon
8,045,391 B2 10/2011 Mohklesi
8,059,438 B2 11/2011 Chang et al.
8,095,825 B2 1/2012 Hirotsu et al.
8,117,462 B2 2/2012 Snapp et al.
8,164,942 B2 4/2012 Gebara et al.
8,208,328 B2 6/2012 Hong
8,213,248 B2 7/2012 Moon et al.
8,223,568 B2 7/2012 Seo
8,238,173 B2 8/2012 Akerib et al.
8,274,841 B2 9/2012 Shinano et al.
8,279,683 B2 10/2012 Klein
8,310,884 B2 11/2012 Iwai et al.
8,332,367 B2 12/2012 Bhattacherjee et al.
8,339,824 B2 12/2012 Cooke
8,339,883 B2 12/2012 Yu et al.
8,347,154 B2 1/2013 Bahali et al.
8,351,292 B2 1/2013 Matano
8,356,144 B2 1/2013 Hessel et al.
8,417,921 B2 4/2013 Gonion et al.
8,462,532 B1 6/2013 Argyres
8,484,276 B2 7/2013 Carlson et al.
8,495,438 B2 7/2013 Roine
8,503,250 B2 8/2013 Demone
8,526,239 B2 9/2013 Kim
8,533,245 B1 9/2013 Cheung
8,555,037 B2 10/2013 Gonion

(56) References Cited

U.S. PATENT DOCUMENTS

| | | | |
|---|---|---|---|
| 8,599,613 | B2 | 12/2013 | Abiko et al. |
| 8,605,015 | B2 | 12/2013 | Guttag et al. |
| 8,625,376 | B2 | 1/2014 | Jung et al. |
| 8,644,101 | B2 | 2/2014 | Jun et al. |
| 8,650,232 | B2 | 2/2014 | Stortz et al. |
| 8,873,272 | B2 | 10/2014 | Lee |
| 8,964,496 | B2 | 2/2015 | Manning |
| 8,971,124 | B1 | 3/2015 | Manning |
| 9,015,390 | B2 | 4/2015 | Klein |
| 9,047,193 | B2 | 6/2015 | Lin et al. |
| 9,165,023 | B2 | 10/2015 | Moskovich et al. |
| 9,892,058 | B2 * | 2/2018 | Wilkes ................ G06F 12/1027 |
| 9,996,479 | B2 * | 6/2018 | Lea .................... G06F 12/1408 |
| 2001/0007112 | A1 | 7/2001 | Porterfield |
| 2001/0008492 | A1 | 7/2001 | Higashiho |
| 2001/0010057 | A1 | 7/2001 | Yamada |
| 2001/0028584 | A1 | 10/2001 | Nakayama et al. |
| 2001/0043089 | A1 | 11/2001 | Forbes et al. |
| 2002/0059355 | A1 | 5/2002 | Peleg et al. |
| 2003/0167426 | A1 | 9/2003 | Slobodnik |
| 2003/0222879 | A1 | 12/2003 | Lin et al. |
| 2004/0073592 | A1 | 4/2004 | Kim et al. |
| 2004/0073773 | A1 | 4/2004 | Demjanenko |
| 2004/0085840 | A1 | 5/2004 | Vali et al. |
| 2004/0095826 | A1 | 5/2004 | Perner |
| 2004/0154002 | A1 | 8/2004 | Ball et al. |
| 2004/0205289 | A1 | 10/2004 | Srinivasan |
| 2004/0240251 | A1 | 12/2004 | Nozawa et al. |
| 2005/0015557 | A1 | 1/2005 | Wang et al. |
| 2005/0078514 | A1 | 4/2005 | Scheuerlein et al. |
| 2005/0097417 | A1 | 5/2005 | Agrawal et al. |
| 2006/0047937 | A1 | 3/2006 | Selvaggi et al. |
| 2006/0069849 | A1 | 3/2006 | Rudelic |
| 2006/0146623 | A1 | 7/2006 | Mizuno et al. |
| 2006/0149804 | A1 | 7/2006 | Luick et al. |
| 2006/0181917 | A1 | 8/2006 | Kang et al. |
| 2006/0215432 | A1 | 9/2006 | Wickeraad et al. |
| 2006/0225072 | A1 | 10/2006 | Lari et al. |
| 2006/0282644 | A1 * | 12/2006 | Wong .................. G06F 12/0246 711/206 |
| 2006/0291282 | A1 | 12/2006 | Liu et al. |
| 2007/0103986 | A1 | 5/2007 | Chen |
| 2007/0171747 | A1 | 7/2007 | Hunter et al. |
| 2007/0180006 | A1 | 8/2007 | Gyoten et al. |
| 2007/0180184 | A1 | 8/2007 | Sakashita et al. |
| 2007/0195602 | A1 | 8/2007 | Fong et al. |
| 2007/0285131 | A1 | 12/2007 | Sohn |
| 2007/0285979 | A1 | 12/2007 | Turner |
| 2007/0291532 | A1 | 12/2007 | Tsuji |
| 2008/0025073 | A1 | 1/2008 | Arsovski |
| 2008/0037333 | A1 | 2/2008 | Kim et al. |
| 2008/0052711 | A1 | 2/2008 | Forin et al. |
| 2008/0137388 | A1 | 6/2008 | Krishnan et al. |
| 2008/0165601 | A1 | 7/2008 | Matick et al. |
| 2008/0178053 | A1 | 7/2008 | Gorman et al. |
| 2008/0215937 | A1 | 9/2008 | Dreibelbis et al. |
| 2009/0067218 | A1 | 3/2009 | Graber |
| 2009/0154238 | A1 | 6/2009 | Lee |
| 2009/0154273 | A1 | 6/2009 | Borot et al. |
| 2009/0182976 | A1 * | 7/2009 | Agesen ............... G06F 12/1009 711/207 |
| 2009/0254697 | A1 | 10/2009 | Akerib |
| 2010/0023682 | A1 | 1/2010 | Lee et al. |
| 2010/0067296 | A1 | 3/2010 | Li |
| 2010/0091582 | A1 | 4/2010 | Vali et al. |
| 2010/0162038 | A1 | 6/2010 | Hulbert et al. |
| 2010/0172190 | A1 | 7/2010 | Lavi et al. |
| 2010/0180145 | A1 | 7/2010 | Chu |
| 2010/0210076 | A1 | 8/2010 | Gruber et al. |
| 2010/0226183 | A1 | 9/2010 | Kim |
| 2010/0308858 | A1 | 12/2010 | Noda et al. |
| 2010/0332895 | A1 | 12/2010 | Billing et al. |
| 2011/0051523 | A1 | 3/2011 | Manabe et al. |
| 2011/0063919 | A1 | 3/2011 | Chandrasekhar et al. |
| 2011/0093662 | A1 | 4/2011 | Walker et al. |
| 2011/0103151 | A1 | 5/2011 | Kim et al. |
| 2011/0119467 | A1 | 5/2011 | Cadambi et al. |
| 2011/0122695 | A1 | 5/2011 | Li et al. |
| 2011/0140741 | A1 | 6/2011 | Zerbe et al. |
| 2011/0219260 | A1 | 9/2011 | Nobunaga et al. |
| 2011/0267883 | A1 | 11/2011 | Lee et al. |
| 2011/0317496 | A1 | 12/2011 | Bunce et al. |
| 2012/0005397 | A1 | 1/2012 | Lim et al. |
| 2012/0017039 | A1 | 1/2012 | Margetts |
| 2012/0023281 | A1 | 1/2012 | Kawasaki et al. |
| 2012/0120705 | A1 | 5/2012 | Mitsubori et al. |
| 2012/0134216 | A1 | 5/2012 | Singh |
| 2012/0134226 | A1 | 5/2012 | Chow |
| 2012/0135225 | A1 | 5/2012 | Chow |
| 2012/0140540 | A1 | 6/2012 | Agam et al. |
| 2012/0182798 | A1 | 7/2012 | Hosono et al. |
| 2012/0195146 | A1 | 8/2012 | Jun et al. |
| 2012/0198310 | A1 | 8/2012 | Tran et al. |
| 2012/0246380 | A1 | 9/2012 | Akerib et al. |
| 2012/0265964 | A1 | 10/2012 | Murata et al. |
| 2012/0281486 | A1 | 11/2012 | Rao et al. |
| 2012/0303627 | A1 | 11/2012 | Keeton et al. |
| 2012/0331265 | A1 * | 12/2012 | Rozario .............. G06F 12/1009 711/207 |
| 2013/0003467 | A1 | 1/2013 | Klein |
| 2013/0061006 | A1 | 3/2013 | Hein |
| 2013/0107623 | A1 | 5/2013 | Kavalipurapu et al. |
| 2013/0117541 | A1 | 5/2013 | Choquette et al. |
| 2013/0124783 | A1 | 5/2013 | Yoon et al. |
| 2013/0132702 | A1 | 5/2013 | Patel et al. |
| 2013/0138646 | A1 | 5/2013 | Sirer et al. |
| 2013/0163362 | A1 | 6/2013 | Kim |
| 2013/0173888 | A1 | 7/2013 | Hansen et al. |
| 2013/0205114 | A1 | 8/2013 | Badam et al. |
| 2013/0219112 | A1 | 8/2013 | Okin et al. |
| 2013/0227361 | A1 | 8/2013 | Bowers et al. |
| 2013/0283122 | A1 | 10/2013 | Anholt et al. |
| 2013/0286705 | A1 | 10/2013 | Grover et al. |
| 2013/0326154 | A1 | 12/2013 | Haswell |
| 2013/0332707 | A1 | 12/2013 | Gueron et al. |
| 2014/0089572 | A1 * | 3/2014 | Koka .................. G06F 12/1009 711/105 |
| 2014/0185395 | A1 | 7/2014 | Seo |
| 2014/0215185 | A1 | 7/2014 | Danielsen |
| 2014/0250279 | A1 | 9/2014 | Manning |
| 2014/0344934 | A1 | 11/2014 | Jorgensen |
| 2015/0029798 | A1 | 1/2015 | Manning |
| 2015/0042380 | A1 | 2/2015 | Manning |
| 2015/0063052 | A1 | 3/2015 | Manning |
| 2015/0078108 | A1 | 3/2015 | Cowles et al. |
| 2015/0279466 | A1 | 3/2015 | Manning |
| 2015/0120987 | A1 | 4/2015 | Wheeler |
| 2015/0134713 | A1 | 5/2015 | Wheeler |
| 2015/0270015 | A1 | 9/2015 | Murphy et al. |
| 2015/0324290 | A1 | 11/2015 | Leidel |
| 2015/0325272 | A1 | 11/2015 | Murphy |
| 2015/0356009 | A1 | 12/2015 | Wheeler et al. |
| 2015/0356022 | A1 | 12/2015 | Leidel et al. |
| 2015/0357007 | A1 | 12/2015 | Manning et al. |
| 2015/0357008 | A1 | 12/2015 | Manning et al. |
| 2015/0357019 | A1 | 12/2015 | Wheeler et al. |
| 2015/0357020 | A1 | 12/2015 | Manning |
| 2015/0357021 | A1 | 12/2015 | Hush |
| 2015/0357022 | A1 | 12/2015 | Hush |
| 2015/0357023 | A1 | 12/2015 | Hush |
| 2015/0357024 | A1 | 12/2015 | Hush et al. |
| 2015/0357047 | A1 | 12/2015 | Tiwari |
| 2016/0062672 | A1 | 3/2016 | Wheeler |
| 2016/0062673 | A1 | 3/2016 | Tiwari |
| 2016/0062692 | A1 | 3/2016 | Finkbeiner et al. |
| 2016/0062733 | A1 | 3/2016 | Tiwari |
| 2016/0063284 | A1 | 3/2016 | Tiwari |
| 2016/0064045 | A1 | 3/2016 | La Fratta |
| 2016/0064047 | A1 | 3/2016 | Tiwari |
| 2016/0098208 | A1 | 4/2016 | Willcock |
| 2016/0098209 | A1 | 4/2016 | Leidel et al. |
| 2016/0110135 | A1 | 4/2016 | Wheeler et al. |
| 2016/0125919 | A1 | 5/2016 | Hush |

(56) References Cited

U.S. PATENT DOCUMENTS

| | | | | |
|---|---|---|---|---|
| 2016/0140048 | A1* | 5/2016 | Mukherjee | G06F 12/1027 711/135 |
| 2016/0147667 | A1* | 5/2016 | Awasthi | G06F 12/1425 711/163 |
| 2016/0154596 | A1 | 6/2016 | Willcock et al. | |
| 2016/0155482 | A1 | 6/2016 | La Fratta | |
| 2016/0188250 | A1 | 6/2016 | Wheeler | |
| 2016/0196142 | A1 | 7/2016 | Wheeler et al. | |
| 2016/0196856 | A1 | 7/2016 | Tiwari et al. | |
| 2016/0225422 | A1 | 8/2016 | Tiwari et al. | |
| 2016/0266873 | A1 | 9/2016 | Tiwari et al. | |
| 2016/0266899 | A1 | 9/2016 | Tiwari | |
| 2016/0267951 | A1 | 9/2016 | Tiwari | |
| 2016/0283396 | A1* | 9/2016 | Ter-Grigoryan | G06F 12/1009 |
| 2016/0292080 | A1 | 10/2016 | Leidel et al. | |
| 2016/0306584 | A1 | 10/2016 | Zawodny et al. | |
| 2016/0306614 | A1 | 10/2016 | Leidel et al. | |
| 2016/0365129 | A1 | 12/2016 | Willcock | |
| 2016/0371033 | A1 | 12/2016 | La Fratta et al. | |
| 2017/0212843 | A1* | 7/2017 | Agesen | G06F 12/1009 |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |
| WO | 2016016605 | 2/2016 |

OTHER PUBLICATIONS

Felix: fast and energy-efficient logic in memory; Gupta et al.; Proceedings of the International Conference on Computer-Aided Design, Article No. 55; Nov. 5-8, 2018 (Year: 2018).*

Lupis: Latch-up based ultra efficient processing in-memory system; Sim et al.; 19th International Symposium on Quality Electronic Design; Mar. 13-14, 2018 (Year: 2018).*

GenPIM: Generalized processing in-memory to accelerate data intensive applications; Imani et al.; 2018 Design, Automation & Test in Europe; Mar. 19-23, 2018 (Year: 2016).*

New current-mode sense amplifiers for high density DRAM and PIM architectures; Yoo et al.; 2001 IEEE International Symposium on Circuits and Systems; May 6-9, 2001 (Year: 2001).*

Processing In Memory: Chips to Petaflops ; Kogge et al.; In Workshop on Mixing Logic and DRAM: Chips that Compute and Remember at ISCA '97; 1997; retrieved from http://www.cs.ucf.edu/courses/cda5106/summer02/papers/kogge97PIM.pdf on Feb. 25, 2019 (Year: 1997).*

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

International Search Report and Written Opinion for related PCT Application No. PCT/US2018/017901, dated May 28, 2018, 25 pages.

Office Action for related Taiwan Patent Application No. 107105673, dated Oct. 15, 2018, 9 pages.

Office Action for related Taiwan Patent Application No. 107105673, dated Mar. 11, 2019, 18 pages.

* cited by examiner

TABLE 7-1

| 744 | 745 | 756 | 770 | 771 |
|---|---|---|---|---|
| A | B | NOT OPEN | OPEN TRUE | OPEN INVERT |
| 0 | 0 | 0 | 0 | 1 |
| 0 | 1 | 0 | 1 | 0 |
| | | 775 | | |
| 1 | 0 | 1 | 0 | 1 |
| 1 | 1 | 1 | 1 | 0 |

TABLE 7-2

| | | | | | | | | | | | |
|---|---|---|---|---|---|---|---|---|---|---|---|
| | FF | 0 | 0 | 0 | 0 | 0 | 0 | 1 | 1 | 1 | 776 |
| | FT | 0 | 0 | 0 | 1 | 1 | 1 | 0 | 0 | 0 | 777 |
| | TF | 0 | 0 | 1 | 0 | 0 | 1 | 0 | 0 | 1 | 778 |
| | TT | 0 | 1 | 0 | 0 | 1 | 0 | 0 | 1 | 0 | 779 |
| A | B | A | A*B | $A*\overline{B}$ | A+B | B | AXB | $A+\overline{B}$ | $\overline{AXB}$ | $\overline{B}$ | 747 |
| 0 | 0 | 0 | 0 | 0 | 0 | 0 | 0 | 1 | 1 | 1 | |
| 0 | 1 | 0 | 0 | 0 | 1 | 1 | 1 | 0 | 0 | 0 | |
| 1 | 0 | 1 | 0 | 1 | 1 | 0 | 1 | 1 | 0 | 1 | |
| 1 | 1 | 1 | 1 | 0 | 1 | 1 | 0 | 1 | 1 | 0 | |

MEMORY ARRAY PAGE TABLE WALK

TECHNICAL FIELD

The present disclosure relates generally to semiconductor memory and methods, and more particularly, to apparatuses and methods related to page tables.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., inversion) logical operations on data (e.g., one or more operands). For example, functional unit circuitry may be used to perform arithmetic operations such as addition, subtraction, multiplication, and division on operands via a number of logical operations.

A number of components in a computing system may be involved in providing instructions to the functional unit circuitry for execution. The instructions may be executed, for instance, by a processing resource such as a controller and/or host processor. Data (e.g., the operands on which the instructions will be executed) may be stored in a memory array that is accessible by the functional unit circuitry. The instructions and data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the instructions and data may also be sequenced and/or buffered.

In many instances, the processing resources (e.g., processor and/or associated functional unit circuitry) may use virtual addresses to access physical addresses. A virtual address may be mapped to a physical address using a translation lookaside buffer (TLB). In response to a virtual address mapping being absent from a TLB, a page table walk can be performed in order to determine the physical address associated with the virtual address. A page table walk can be initiated and/or controlled by a controller where each operation of the page table walk can include the controller receiving intermediate results and sending additional instructions for a next operation of the page table walk. The page table walk, throughout the page table walk process, can consume significant amounts of the operating resources of the controller such as electrical power.

BRIEF DESCRIPTION OF THE DRAWINGS

FIG. 7 is a logic table illustrating selectable logic operation results implemented by a sensing circuitry in accordance with embodiments of the present disclosure.

DETAILED DESCRIPTION

Figure 1:
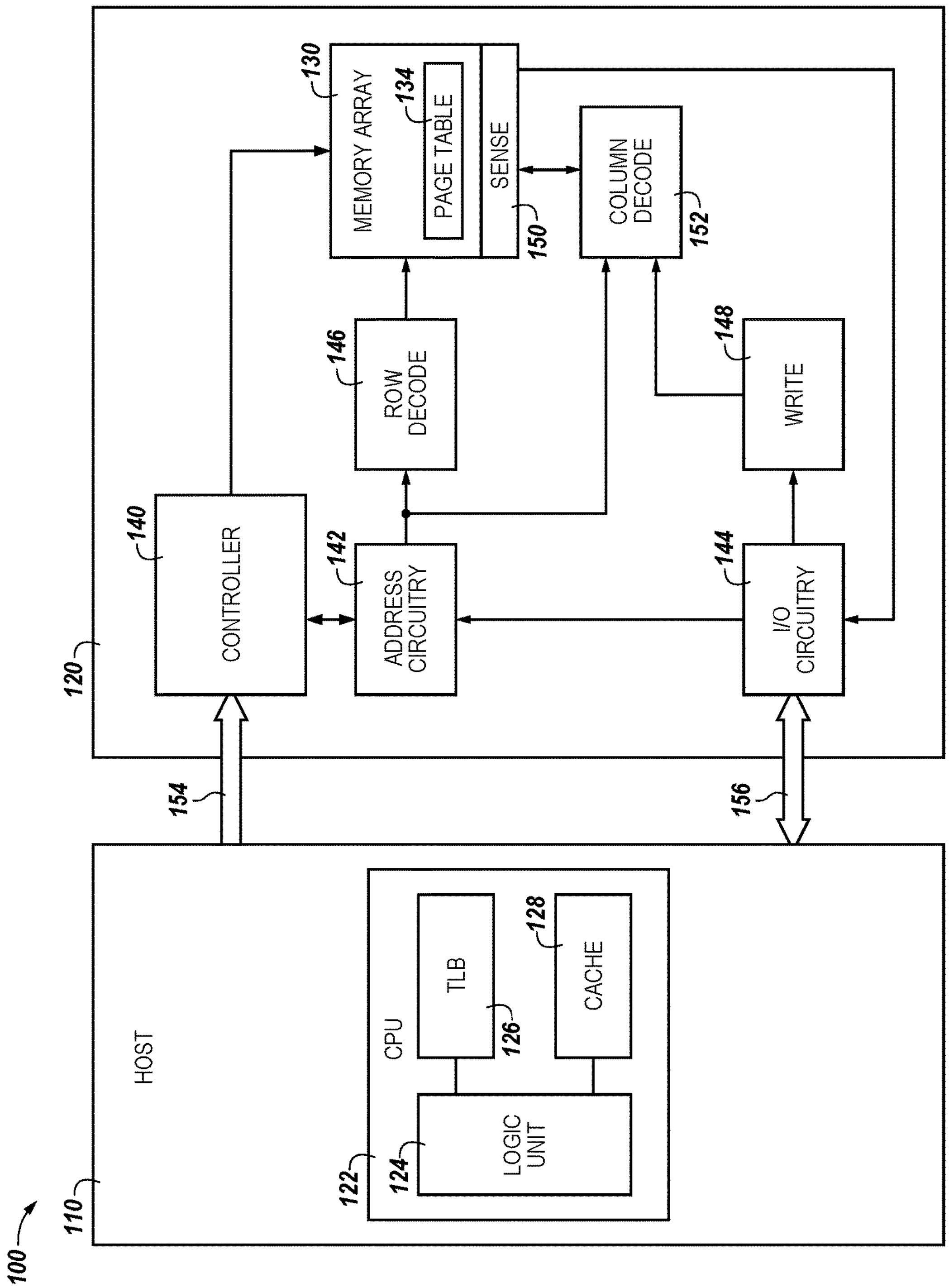
FIG. 1 is a block diagram of an apparatus in the form of a computing system including a memory device in accordance with embodiments of the present disclosure.

The present disclosure includes apparatuses and methods related to a memory array page table walk. An example apparatus comprises an array of memory cells. The example apparatus can comprise sensing circuitry coupled to the array. A controller can be coupled to the array and the controller can be configured to operate the sensing circuitry to cause a storing of a page table in the array. The controller can be configured to determine a physical address of a portion of data by accessing the page table in the array of memory cells. The controller can be configured to operate the sensing circuitry to cause storing of the portion of data in a buffer.

In at least one embodiment, a host can access a translation lookaside buffer (TLB) to determine a physical address associated with a known virtual address. In response to the virtual address mapping to the physical address being absent from the TLB, a page table walk can be performed to determine the physical address. For example, an operating system that uses virtual memory is given the impression that the memory is a large, contiguous section of memory. Physically, the memory may be dispersed across different areas of physical memory. When a process operated by the host requests access to data in the memory, the operating system can be tasked with mapping the virtual address provided by the process to a physical address of the physical memory where the data is located or stored. A translation lookaside buffer (TLB) can be a cache used to improve virtual address translation to physical addresses. The TLB can be implemented as a content-addressable memory (CAM). The search key of the CAM can be the virtual address and the search result can be the physical address. If the requested virtual address is present in the TLB, the TLB can indicate a match and retrieve the corresponding physical address. If the requested address is not located in the TLB, indicated as a miss, the virtual address can be translated to the physical address by using a page table to perform a page table walk through the page table. A page table is a table that the operating system uses to store the mapping of virtual addresses to physical addresses, with each mapping referred to as a page table entry (PTE). The TLB can store more readily accessible translation of virtual to physical addresses while the page table walk can require additional time and resources to determine the corresponding physical address.

In some previous approaches, the host can send commands to a host controller of a memory array for a first operation of the page table walk, receive input from the first operation, and send additional commands for an additional operation of the page table walk. In this way, the host controller can be receiving and/or sending commands to and from the host during each operation of the page table walk. The back and forth between the host and the page table during the page table walk can be time and energy consuming. In at least one embodiment of the present disclosure, as described below, the page table can be stored in a memory array and the memory array can be operated by a memory controller to perform the page table walk operations independent of (e.g., without) sending intermediate results to the host (e.g., to the host controller) from the memory array and without sending intermediate instructions from the host to the memory array. For example, the memory array can include capabilities to perform each operation of a page table walk within the memory without sending input and/or output data to and from the host during each intermediate instruction. In this way, the host controller resources and/or power can be freed in order to use the host controller for additional operations.

For example, a command requesting a physical address of a known virtual address can be sent from a host controller to a memory array. A determination of whether the physical address is in a translation lookaside buffer (TLB) can be performed. In response to the virtual to physical mapping being absent from the TLB, the memory array can perform a page table walk within the memory array and send the physical address to the controller at completion of the page table walk. The operation of the page table walk in memory can include a number of processing-in-memory operations (as describe below in association with FIGS. 5-9) in order to perform the page table walk in memory.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "n", particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 134 may reference element "34" in FIG. 1, and a similar element may be referenced as 234 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including a memory device 120 in accordance with a number of embodiments of the present disclosure. As used herein, a memory device 120, a memory array 130, a controller 140, and/or sensing circuitry 150 might also be separately considered an "apparatus."

The computing system 100 can include a host 110 coupled to the memory device 120, which includes a computational memory device 110 (e.g., including a memory array 111 and/or sensing circuitry 150). The memory device 120 can act as a conventional memory and/or a computational memory. The host 110 can be a host system such as a personal laptop computer, a desktop computer, a digital camera, a mobile telephone, or a memory card reader, among various other types of hosts. The host 110 can include a system motherboard and/or backplane and can include a number of processing resources (e.g., one or more processors, microprocessors, or some other type of controlling circuitry), such as central processing unit (CPU) 122. A mass storage (not illustrated) can be used as a storage device or other media not directly accessible by the CPU 122 such as hard disk drives, solid state drives, optical disc drives, and can be non-volatile memory. In some embodiments, the mass storage can be external to the host 110. The host 110 can be configured with an operating system. The operating system is executable instructions (software) that manages hardware resources and provides services other executable instructions (applications) that run on the operating system. The operating system can implement a virtual memory system.

The CPU 122 can include a logic unit 124 coupled to a translation lookaside buffer (TLB) 126 and CPU cache 128. An example of a logic unit 124 is an arithmetic logic unit (ALU), which is a circuit that can perform arithmetic and bitwise logic operations on integer binary numbers. A number of ALUs can be used to function as a floating point unit (FPU), which is a circuit that operates on floating point numbers and/or a graphics processing unit (GPU), which is a circuit that accelerates the creation of images in a frame buffer intended for output to a display. The TLB 126 is a cache that memory management hardware can use to improve virtual address translation speed. The TLB 126 can be a content addressable memory, where the search key is a virtual address and the search result is a physical address. The TLB 126 can include operating system page table entries, which map virtual addresses to physical addresses and the operating system page table can be stored in memory (e.g., in the memory array 130). The CPU cache 128 can be an intermediate stage between relatively faster registers and relatively slower main memory (not specifically illustrated). Data to be operated on by the CPU 122 may be copied to CPU cache 128 before being placed in a register, where the operations can be effected by the logic unit 124. Although not specifically illustrated, the CPU cache 128 can be a multilevel hierarchical cache.

The computing system 100 can include separate integrated circuits or both the host 110 and the memory array 130 and sense circuitry 150 can be on the same integrated circuit. The computing system 100 can be, for instance, a server system and/or a high performance computing system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines. Although a single array 130 is shown in FIG. 1, embodiments are not so limited. For instance, memory device 120 may include a number of arrays 130 (e.g., a number of banks of DRAM cells). An example DRAM array is described in association with FIG. 2.

The memory device 120 includes address circuitry 142 to latch address signals provided over an I/O bus 156 (e.g., a data bus) through I/O circuitry 144. Address signals may also be received to controller 140 (e.g., via address circuitry 142 and/or via bus 154). Address signals are received and decoded by a row decoder 146 and a column decoder 152 to access the memory array 130. Data can be read from memory array 130 by sensing voltage and/or current changes on the data lines using sensing circuitry 150. The sensing circuitry 150 can read and latch a page (e.g., row) of data from the memory array 130. The I/O circuitry 144 can be used for bi-directional data communication with host 110 over the I/O bus 156. The write circuitry 148 is used to write data to the memory array 130.

Controller 140 decodes signals provided by control bus 154 from the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can be a state machine, a sequencer, or some other type of control circuitry. Controller 140 can be implemented in hardware, firmware, and/or software. Controller 140 can also control shifting circuitry, which can be implemented, for example, in the sensing circuitry 150 according to various embodiments.

Examples of the sensing circuitry 150 are described further below. For instance, in a number of embodiments, the sensing circuitry 150 can comprise a number of sense amplifiers (e.g., sense amplifier shown as 506 in FIG. 5 and 606 in FIG. 6) and a number of compute components (e.g., compute component shown as 531 in FIG. 5 and 631 in FIG. 6), which can be used to perform logical operations (e.g., such as page table walk operations on data associated with complementary data lines). The sense amplifier can comprise a static latch, for example, which can be referred to herein as the primary latch. The compute component 531 can comprise a dynamic and/or static latch, for example, which can be referred to herein as the secondary latch, and which can serve as, and be referred to as, an accumulator.

In a number of embodiments, the sensing circuitry (e.g., 150) can be used to perform logical operations (e.g., page table walk operations) using data stored in array 130 as inputs and store the results of the logical operations back to the array 130 without transferring data via a sense line address access (e.g., without firing a column decode signal). As such, various logical functions can be performed using, and within, sensing circuitry 150 rather than (or in association with) being performed by processing resources external to the sensing circuitry (e.g., by a processor associated with host 110 and/or other processing circuitry, such as ALU circuitry, located on device 120 (e.g., on controller 140 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform logical functions using the operands, and the result would be transferred back to the array (e.g., 130) via the I/O lines. In contrast, in a number of embodiments of the present disclosure, sensing circuitry (e.g., 150) is configured to perform logical operations on data stored in memory (e.g., array 130) and store the result back to the memory without enabling an I/O line (e.g., a local I/O line) coupled to the sensing circuitry, which can be formed on pitch with the memory cells of the array. Enabling an I/O line can include enabling (e.g., turning on) a transistor having a gate coupled to a decode signal (e.g., a column decode signal) and a source/drain coupled to the I/O line. Embodiments are not so limited. For instance, in a number of embodiments, the sensing circuitry (e.g., 150) can be used to perform logical operations without enabling column decode lines of the array; however, the local I/O line(s) may be enabled in order to transfer a result to a suitable location other than back to the array (e.g., to an external register).

As such, in a number of embodiments, various circuitry external to array 130 and sensing circuitry 150 (e.g., external registers associated with an ALU) is not needed to perform logical functions as the sensing circuitry 150 can perform the appropriate logical operations to perform such logical functions without the use of an external processing resource. Therefore, the sensing circuitry 150 may be used to compliment and/or to replace, at least to some extent, such an external processing resource (or at least the bandwidth of such an external processing resource). However, in a number of embodiments, the sensing circuitry 150 may be used to perform logical operations (e.g., to execute instructions) in addition to logical operations performed by an external processing resource (e.g., host 110). For instance, host 110 and/or sensing circuitry 150 may be limited to performing only certain logical operations and/or a certain number of logical operations.

In at least one embodiment, the host 110 can determine whether a virtual address is located in the TLB 126 of the host 110. In response to the TLB 126 including the virtual address, the corresponding physical address can be located in the TLB 126 and used to locate the data associated with the original virtual address. In response to the TLB 126 not including the virtual address (e.g., a miss indicated by the TLB 126), the host 110 can send a command to the memory device 120 to locate the virtual address in a page table 134 of the memory array 130. A number of processing-in-memory operations, as described below, can be performed in the memory to perform a page table walk to locate the physical address in the page table 134.

Figure 2:
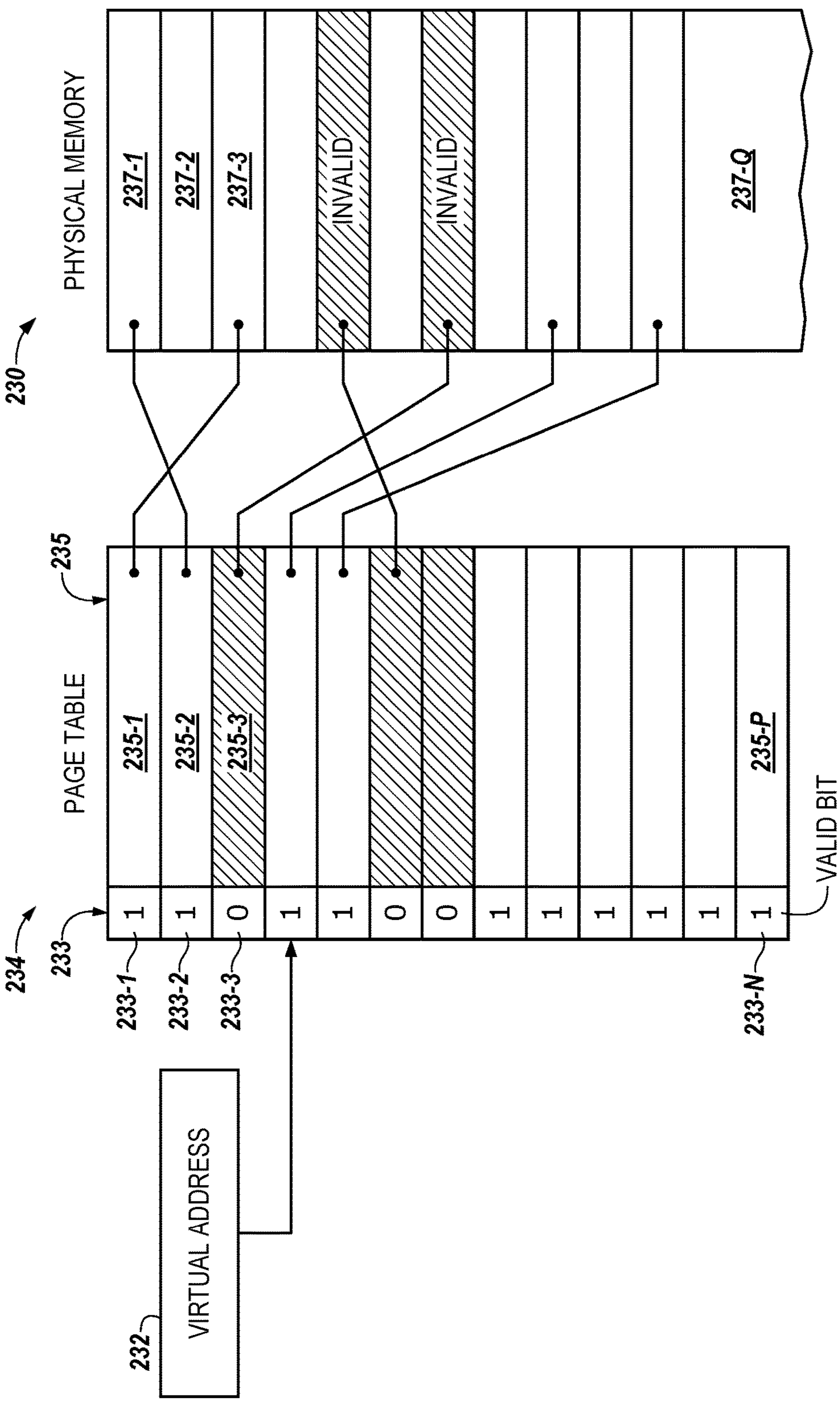
FIG. 2 is a schematic diagram illustrating a memory system in accordance with embodiments of the present disclosure.

FIG. 2 is a schematic diagram illustrating a memory system in accordance with a number of embodiments of the present disclosure. FIG. 2 includes a virtual address 232, a page table 234, and a physical memory 230 (e.g., such as memory array 130 in FIG. 1). The physical memory 230 can store data at physical addresses 237-1, 237-2, 237-3, . . . , 237-Q. In some examples, a controller (e.g., controller 140 in FIG. 1) can determine a physical location of a portion of data using a virtual address, such as virtual address 232. For example, a portion of data associated with the virtual address 232 can be requested to be used by the controller to perform a number of operations. The portion of data can be located at a physical location in a memory 230. The virtual address 232 can be used to determine the physical location of the portion of data.

A virtual address 232 can indicate a corresponding physical page that stores a portion of data. The virtual address 232 can be used to search a page table 234 (e.g., a lookup page table). A page table 234 can be a data structure that is used to map between a virtual address (e.g., virtual address 232) and a physical address (e.g., physical address 237-3) of data stored in physical memory 230. In at least one embodiment, a process performed by the system 100 can request a portion of data associated with the virtual address 232 to be accessed. A physical address corresponding to the virtual address 232 can be used by hardware, or more specifically, by a RAM system. In response to the page table indicating that the portion of data associated with the virtual address 232 is not located in the memory array 230, the portion of data may be located in an additional memory array (e.g., an external memory array not on the memory device 120). The page table 234 can include a number of page table entries (PTEs) 235. For example, a first PTE entry 235-1 can be a first mapping of a virtual address to a physical address 237-3. A valid bit "1" 233-1 can indicate that the first PTE 235-1 is located in the physical memory 230. A second PTE entry 235-2 can be a second mapping of a virtual address to a physical address 237-1, indicated as being located in the physical memory 230 by a valid bit "1" 233-2. A physical address 237-2 is illustrated as not associated with a PTE in the page table 234.

Each corresponding PTE entry 235 can be associated with a valid bit 233. The second PTE entry 235-2 can be associated with a valid bit 233-2. The valid bit 233-2 can be a "1" and can indicate that a corresponding virtual address is mapped to a valid physical address. A third PTE entry 235-3 can be associated with a valid bit 233-3. The valid bit 233-3 can be a "0" and can indicate that a corresponding virtual address is not mapped to a valid physical address (indicated by "INVALID" in a corresponding physical address 237 location). The page table 234 can include P number of PTE entries ranging from a first PTE entry 235-1 to a Pth PTE entry 235-P and an Nth valid bit 233-N.

Figure 3:
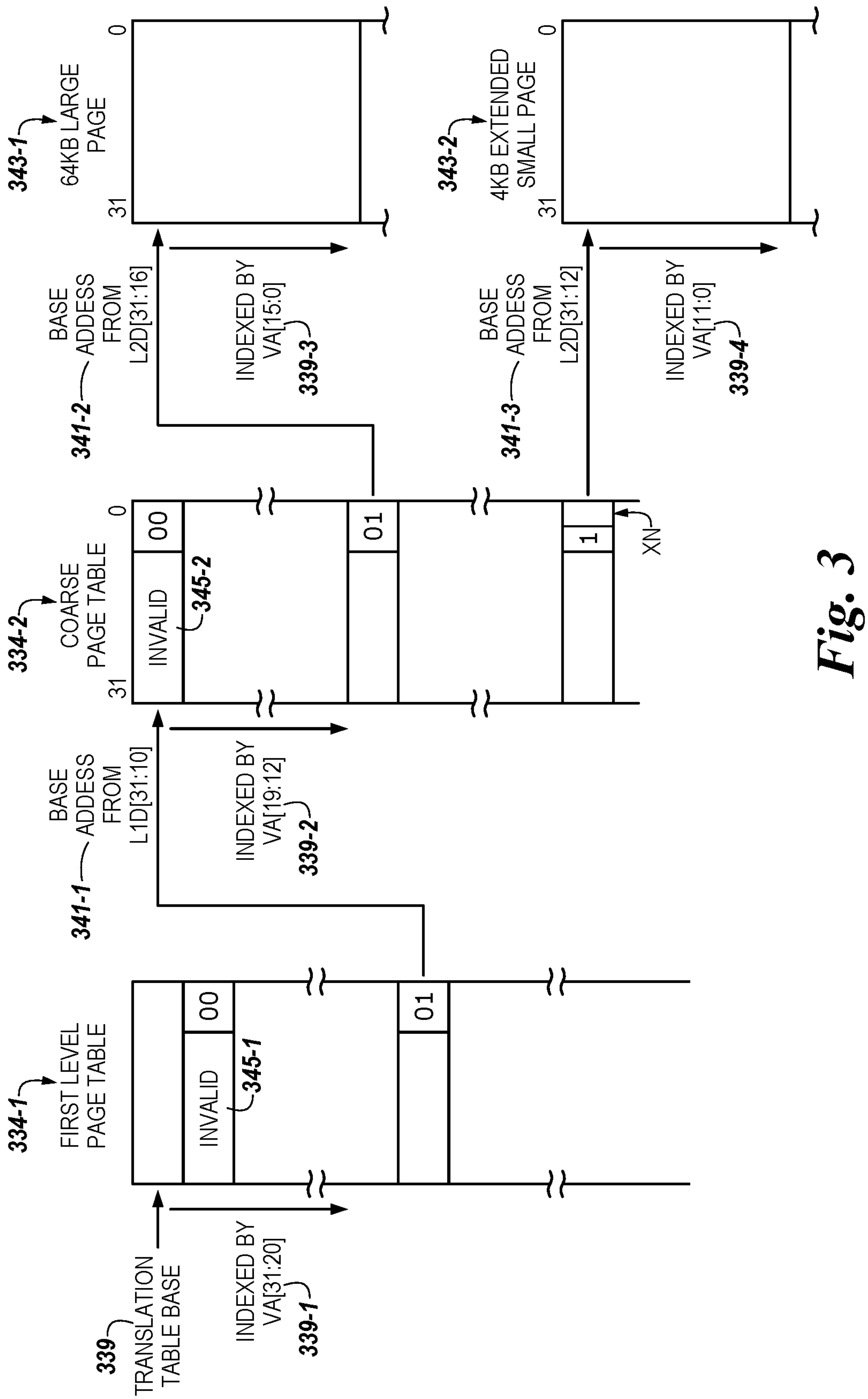
FIG. 3 is a schematic diagram illustrating page table addressing in accordance with embodiments of the present disclosure.

FIG. 3 is a schematic diagram illustrating page table addressing in accordance with a number of embodiments of the present disclosure. A page table can include a number of levels used to map a virtual address to a physical address. A translation table base 339 can indicate a location within a first level page table 334-1 to begin mapping a virtual address to a physical address. The first level page table 334-1 can be indexed by virtual address 339-1 that ranges from address bits 31 to 20 (e.g., "31:20"). An invalid bit 345-1 can indicate that a particular virtual address is not mapped to a physical address. A virtual address associated with a valid bit "01" can indicate a particular location within a coarse page table 334-2.

A base address 341-1 of the virtual address (VA) from the first level page table 334-1 (e.g., "L1D[31:10]", indicating level one data that ranges from bits 31 to 10) can indicate a location within a coarse page table 334-2 to continue determining a physical address. The coarse page table 334-2 can be indexed by bits 19 to 12 (e.g., "19:12") 339-2 of the address. An invalid bit 345-2 (e.g., "00") can indicate that a particular virtual address is not mapped to a physical address in the coarse page table 334-2, indicated by a lack of an arrow between the coarse page table 334-2 and the large page 343-1. A base address 341-2 of the VA from the coarse page table 334-2 (e.g., "L2D[31:16]", indicating level two data that ranges from bits 31 to 16).

An intermediate bit of "01" of the coarse page table 334-2 can indicate that a virtual address is located within a large page (e.g., 64 KB) 343-1 of data. The large page 343-1 can be indexed by bits 15 to 0 (e.g., "15:0") 339-3 of the virtual address. An upper bit "1XN" of the coarse page table 334-2 can indicate that a virtual address is located within a small page (e.g., a 4 KB extended small page) 343-2. A base address 341-3 of the VA from the coarse page table 334-2 (e.g., "L2D[31:12]", indicating level two data that ranges from bits 31 to 12). The small page 343-2 can be indexed by bits 11 to 0 (e.g., "11:0") 339-4 of the virtual address.

In at least one embodiment, a page table can be stored in memory (e.g., memory array 130 in FIG. 1). Instructions to determine a physical address from a virtual address using the page table in memory can be sent from a host (e.g., host 110) to a memory (e.g., 130) so that the memory can perform a page table walk within the memory. In this way, the memory can perform the page table walk using a page table within the memory without additional instructions and/or control from the host to complete the page table walk.

An example of a page table walk performed in memory is illustrated by the following pseudocode below:

```
1. 1st Level page table deference:
    a. Store virtual address in register R1;
    b. Mask bits 0...19 of R1 and store in R2;
    c. Store translation base address in register R3;
    d. Perform AND on R2 and R3 and store in R4;
    e. Read address indicated by R4 and store result in R4;
2. 2nd Level page table dereference:
    a. Mask bits 0...11, 20...31 of R1 and store in R2;
    b. Perform AND on R2 and R4 and store result in R4;
```

Figure 5:
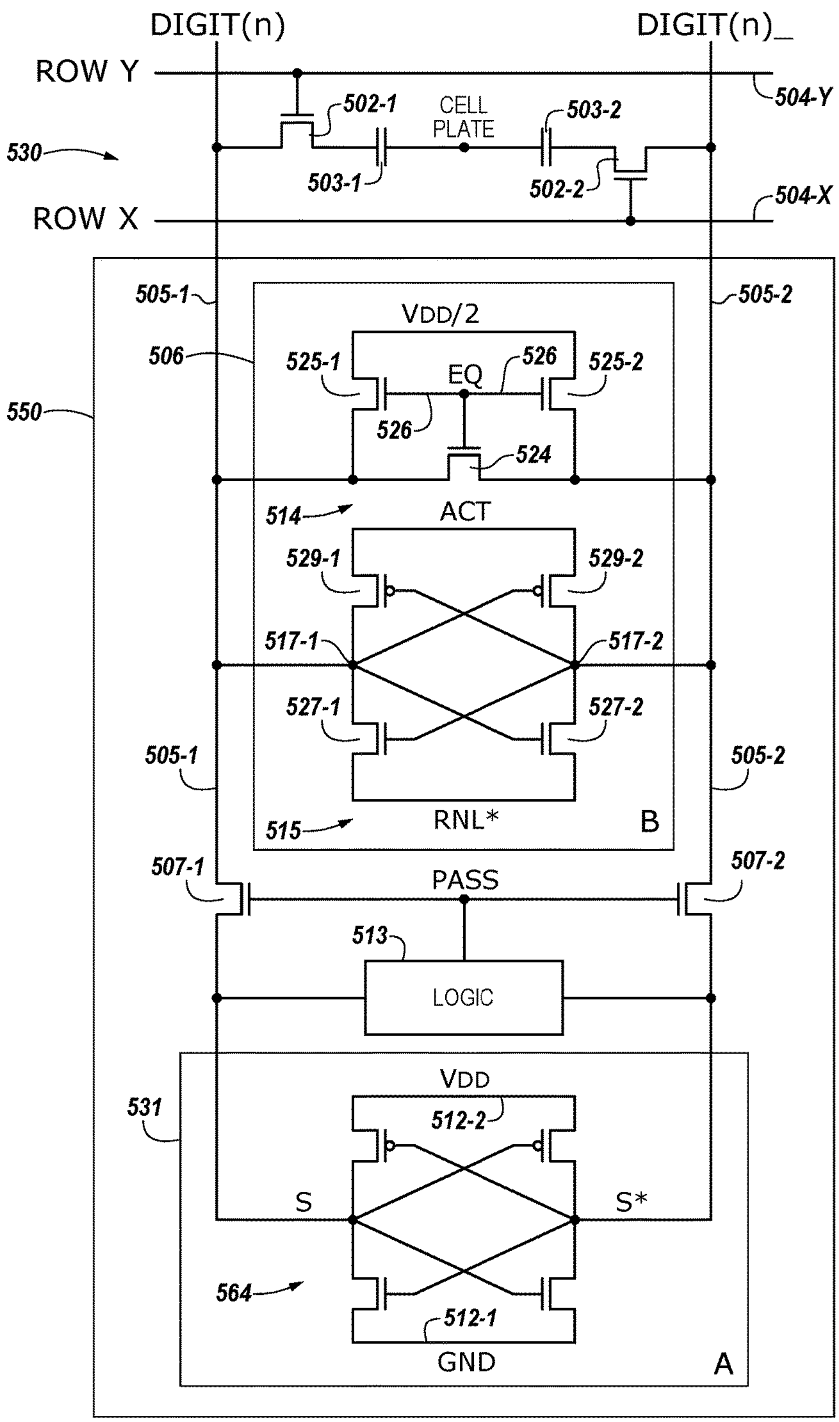
FIG. 5 is a schematic diagram illustrating sensing circuitry in accordance with embodiments of the present disclosure.

As an example of the above pseudocode being used to perform a page table walk, a first level page table can be de-referenced. In association with pseudocode 1.*a* (e.g., "Store virtual address in register R1"), a virtual address can be stored in a first register (e.g., a first row of memory cells associated with ROW Y, as illustrated in FIG. 5 below). In association with pseudocode 1.*b* (e.g., Mask bits 0 . . . 19 of R1 and store in R2"), the $0^{th}$ bit (e.g., a least significant bit) through a $19^{th}$ bit (e.g., a $19^{th}$ most significant bit) of the virtual address stored in the first register can be masked. Therefore, the $20^{th}$ through the $31^{st}$ bit, as illustrated in the example in FIG. 3, can be left unmasked, as indicated by "INDEXED BY VA[31:20]" 339-1 in FIG. 3 for the First Level Page Table 334-1. Further, the virtual address with the $0^{th}$ to $19^{th}$ bits masked can be stored in a second register (e.g., a second row of memory cells in array 530, not illustrated).

In association with pseudocode 1.*c* (e.g., Store translation base address in register R3"), a translation table base address (e.g., BASE ADDRESS FROM L1D[31:10] 341-1 in FIG. 3) can be stored in a third register (e.g., a third row of memory cells in array 530, not illustrated). A translation table base address can indicate a base address of a table in physical memory that contains section or page descriptors, or both. A page descriptor can provide a base address of a page table that contains second-level descriptors for either large page or small page accesses, for example. In association with pseudocode 1.*d* (e.g., "Perform AND on R2 and R3 and store in R4"), an AND operation can be performed on the masked virtual address stored in the second register and the translation table base address can be stored in the third register. In association with pseudocode 1.*e* (e.g., Read address indicated by R4 and store result in R4), data stored in the fourth register "R4" (e.g., a fourth row of memory cells in array 530, not illustrated) can indicate a read address to be used and the data stored at the read address location can be read and stored in the fourth register.

In association with pseudocode 2. (e.g., "$2^{nd}$ Level page table dereference"), a second level page table can be dereferenced. In association with pseudocode 2.*a* (e.g., "Mask bits 0 . . . 11, 20 . . . 31 of R1 and store in R2"), the $0^{th}$ bit (e.g. the least significant bit) through the $11^{th}$ bit can be masked and the $20^{th}$ bit through the $31^{th}$ bit can be masked. Thereby, the $12^{th}$ bit through the $19^{th}$ bit are left unmasked (e.g., as indicated by "INDEXED BY VA [19:12]" 339-2 in FIG. 3). The address with the $0^{th}$ to $11^{th}$ and $20^{th}$ to $31^{st}$ bits masked can be stored in a second register (e.g., a second row of memory cells in the array 530). In association with pseudocode 2.*b* (e.g., "Perform AND on R2 and R4 and store result in R4"), an AND operation can be performed on the data stored in the second register and the fourth register. For example, the read address stored in the fourth register during operation of pseudocode 1.*e* can be ANDed with the data including the $0^{th}$ through $11^{th}$ and $20^{th}$ through $31^{st}$ bits masked during operation of pseudocode 2.*a*. The result of the AND operation can be stored in the fourth register.

While this example illustrates an example with a $1^{st}$ level and a second level page table dereference, examples are not so limited. For example, a third level page table dereference can be performed, and so forth. The point is that the instruction to identify a physical address from a virtual address can be transmitted by a host and the operations to perform the page table walk in memory can be performed by the memory itself, rather than receiving additional instructions from the host throughout the page table walk as it is performed. For example, a number of operations (including AND and OR operations) can be performed in the memory, as described in association with FIGS. 5-9 below.

Figure 4:
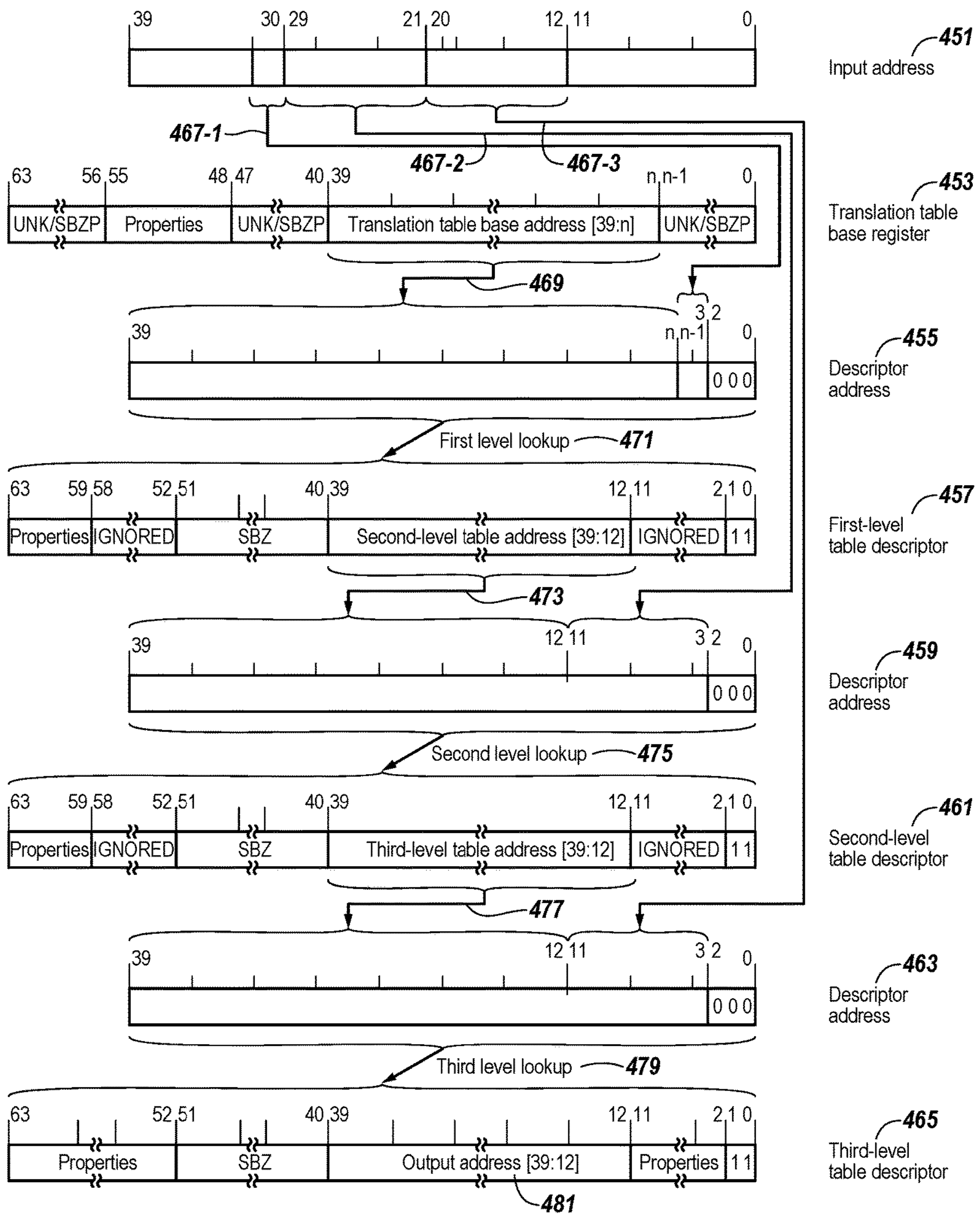
FIG. 4 is a schematic diagram illustrating an example of a page table walk in accordance with embodiments of the present disclosure.

FIG. 4 is a schematic diagram illustrating an example of a page table walk in accordance with a number of embodiments of the present disclosure. The page table walk can be performed on a fully associative cache, as illustrated in FIG. 4. A fully associative cache refers to a cache where data from any address can be stored in any cache location. An entire address is used as the tag and all tags are compared simultaneously (associatively) with a requested address. In response to the requested address being matched, an associated data is accessed. This can address when there is contention for cache locations since a block can be flushed when the whole cache is full and a block to be flushed can be selected in a more efficient way.

The page table walk can include a first portion of data 467-1, a second portion of data 467-2, and a third portion of data 467-3 of an input address 451. The first portion of data 467-1 can include a $30^{th}$ bit of the input address 451. The first portion of data 467-1 can be used to determine a portion of a descriptor address 455. The portion of the descriptor address 455 determined by the first portion of data 467-1 can include the nth-1 bit of the descriptor address 455. A translation table base register 453 (including a 0th bit through a $63^{rd}$ bit) can be used to determine an nth bit through a $39^{th}$ bit of the descriptor address 455 as shown at 469. The descriptor address 455 can be used as a first level lookup 471 to determine the first-level table descriptor 457.

The second portion of data 467-2 can include a 21' bit through a $29^{th}$ bit of the input address 451. The second portion of data 467-2 can be used to determine a portion of a descriptor address 459 of a first-level table descriptor 457. The portion of the descriptor address 459 of the first level table descriptor 457 can include a $3^{rd}$ bit through an $11^{th}$ bit of the descriptor address 459. A $12^{th}$ bit through a $39^{th}$ bit of the first-level table descriptor 457 can be used to determine a $12^{th}$ bit through a $39^{th}$ bit of the descriptor address 459 as shown at 473. The descriptor address 459 can be used as a second level lookup 475 to determine the second-level table descriptor 461.

The third portion of data 467-3 can include a $12^{th}$ bit through a $20^{th}$ bit of the input address 451. The third portion of data 467-3 can be used to determine a portion of a descriptor address 463 of a second-level table descriptor 461. The portion of the descriptor address 463 of the second-level table descriptor 461 can include a $3^{rd}$ bit through an $11^{th}$ bit of the descriptor address 463. A $12^{th}$ bit through a $39^{th}$ bit of the second-level table descriptor 461 can be used to determine a $12^{th}$ bit through a $39^{th}$ bit of the descriptor address 463 as shown at 477. The descriptor address 463 can be used as a third level lookup 479 to determine the third-level table descriptor 465. An output address 481 of the third-level table descriptor 465 can be used to determine the physical address of the virtual address initially used as the input address 451. This page table walk can be performed in the memory in response to receiving a host command requesting a physical address. The page table can be performed without further instructions of the host indicating how to perform the page table walk in memory. The memory can be used to perform the operations to complete the page table walk. For example, as described in association with FIG. 3, a number of mask operations and/or AND operations can be performed in order to determine the first-level 457, second-level 461, and/or third-level 463 table descriptors. While the example in FIG. 4 includes additional labels (e.g., "IGNORED", etc.), the additional labels are used as an example of a page table walk description and is not limited to these additional labels and/or descriptions. In addition, while the input address 451 includes bits 0 to 39, embodiments are not so limited and can include any number of bits. Likewise, the size of the descriptor addresses 455, 459, 463 and the table descriptors 457, 461, 465 are not limited to those illustrated and described in this example.

FIG. 5 is a schematic diagram illustrating sensing circuitry in accordance with a number of embodiments of the present disclosure. A memory cell comprises a storage element (e.g., capacitor) and an access device (e.g., transistor). For instance, transistor 502-1 and capacitor 503-1 comprise a memory cell, and transistor 502-2 and capacitor 503-2 comprise a memory cell, etc. In this example, the memory array 530 is a DRAM array of 1T1C (one transistor one capacitor) memory cells. In a number of embodiments, the memory cells may be destructive read memory cells (e.g., reading the data stored in the cell destroys the data such that the data originally stored in the cell is refreshed after being read).

The cells of the memory array 530 can be arranged in rows coupled by word lines 504-X (ROW X), 504-Y (ROW Y), etc., and columns coupled by pairs of complementary sense lines (e.g., data lines DIGIT(n)/DIGIT(n)_). The individual sense lines corresponding to each pair of complementary sense lines can also be referred to as data lines 505-1 (D) and 505-2 (D_) respectively. Although only one pair of complementary data lines (e.g., one column) are shown in FIG. 5, embodiments of the present disclosure are not so limited, and an array of memory cells can include additional columns of memory cells and/or data lines (e.g., 4,096, 8,192, 16,384, etc.).

Memory cells can be coupled to different data lines and/or word lines. For example, a first source/drain region of a transistor 502-1 can be coupled to data line 505-1 (D), a second source/drain region of transistor 502-1 can be coupled to capacitor 503-1, and a gate of a transistor 502-1 can be coupled to word line 504-Y. A first source/drain region of a transistor 502-2 can be coupled to data line 505-2 (D_), a second source/drain region of transistor 502-2 can be coupled to capacitor 503-2, and a gate of a transistor 502-2 can be coupled to word line 504-X. The cell plate, as shown in FIG. 5, can be coupled to each of capacitors 503-1 and 503-2. The cell plate can be a common node to which a reference voltage (e.g., ground) can be applied in various memory array configurations.

The memory array 530 is coupled to sensing circuitry 550 in accordance with a number of embodiments of the present disclosure. In this example, the sensing circuitry 550 comprises a sense amplifier 506 and a compute component 531 corresponding to respective columns of memory cells (e.g., coupled to respective pairs of complementary data lines). The sensing circuitry 550 can correspond to sensing circuitry 150 shown in FIG. 1, for example. The sense amplifier 506 can be coupled to the pair of complementary sense lines 505-1 and 505-2. The compute component 531 can be coupled to the sense amplifier 506 via pass gates 507-1 and 507-2. The gates of the pass gates 507-1 and 507-2 can be coupled to logical operation selection logic 513.

The logical operation selection logic 513 can be configured to include pass gate logic for controlling pass gates that couple the pair of complementary sense lines 505-1 and 505-2 un-transposed between the sense amplifier 506 and the compute component 531 (as shown in FIG. 5) and/or swap gate logic for controlling swap gates that couple the pair of complementary sense lines transposed between the sense amplifier 506 and the compute component 531. The logical operation selection logic 513 can also be coupled to the pair of complementary sense lines 505-1 and 505-2. The logical operation selection logic 513 can be configured to control pass gates 507-1 and 507-2 (e.g., to control whether the pass gates 507-1 and 507-2 are in a conducting state or a non-conducting state) based on a selected logical operation, as described in detail below for various configurations of the logical operation selection logic 513.

The sense amplifier 506 can be operated to determine a data value (e.g., logic state) stored in a selected memory cell. The sense amplifier 506 can comprise a cross coupled latch, which can be referred to herein as a primary latch. In the example illustrated in FIG. 5, the circuitry corresponding to sense amplifier 506 comprises a latch 515 including four transistors coupled to the pair of complementary data lines 505-1 and 505-2. However, embodiments are not limited to this example. The latch 515 can be a cross coupled latch (e.g., gates of a pair of transistors, such as n-channel transistors (e.g., NMOS transistors) 527-1 and 527-2 are cross coupled with the gates of another pair of transistors, such as p-channel transistors (e.g., PMOS transistors) 529-1 and 529-2 via nodes 517-1 and 517-2).

In operation, when a memory cell is being sensed (e.g., read), the voltage on one of the data lines 505-1 (D) or 505-2 (D_) will be slightly greater than the voltage on the other one of data lines 505-1 (D) or 505-2 (D_). An ACT signal can be driven high and the RNL* signal can be driven low to enable (e.g., fire) the sense amplifier 506. The data line 505-1 (D) or 505-2 (D_) having the lower voltage will turn on one of the PMOS transistor 529-1 or 529-2 to a greater extent than the other of PMOS transistor 529-1 or 529-2, thereby driving high the data line 505-1 (D) or 505-2 (D_) having the higher voltage to a greater extent than the other data line 505-1 (D) or 505-2 (D_) is driven high.

Similarly, the data line 505-1 (D) or 505-2 (D_) having the higher voltage will turn on one of the NMOS transistor 527-1 or 527-2 to a greater extent than the other of the NMOS transistor 527-1 or 527-2, thereby driving low the data line 505-1 (D) or 505-2 (D_) having the lower voltage to a greater extent than the other data line 505-1 (D) or 505-2 (D_) is driven low. As a result, after a short delay, the data line 505-1 (D) or 505-2 (D_) having the slightly greater voltage is driven to the voltage of the supply voltage VDD (e.g., through a source transistor (not shown)), and the other data line 505-1 (D) or 505-2 (D_) is driven to the voltage of the reference voltage (e.g., to ground (GND) through a sink transistor (not shown)). Therefore, the cross coupled NMOS transistors 527-1 and 527-2 and PMOS transistors 529-1 and 529-2 serve as a sense amplifier pair, which amplify the differential voltage on the data lines 505-1 (D) and 505-2 (D_) and operate to latch a data value sensed from the selected memory cell.

Embodiments are not limited to the sense amplifier 506 configuration illustrated in FIG. 5. As an example, the sense amplifier 506 can be current-mode sense amplifier and/or single-ended sense amplifier (e.g., sense amplifier coupled to one data line). Also, embodiments of the present disclosure are not limited to a folded data line architecture such as that shown in FIG. 5.

The sense amplifier 506 can, in conjunction with the compute component 531, be operated to perform various logical operations using data from an array as input. In a number of embodiments, the result of a logical operation can be stored back to the array without transferring the data via a data line address access (e.g., without firing a column decode signal such that data is transferred to circuitry external from the array and sensing circuitry via local I/O lines). As such, a number of embodiments of the present disclosure can enable performing logical operations associated therewith using less power than various previous approaches. Additionally, since a number of embodiments can eliminate the need to transfer data across I/O lines in order to perform logical functions (e.g., between memory and discrete processor), a number of embodiments can enable an increased parallel processing capability as compared to previous approaches.

The sense amplifier 506 can further include equilibration circuitry 514, which can be configured to equilibrate the data lines 505-1 (D) and 505-2 (D_). In this example, the equilibration circuitry 514 comprises a transistor 524 coupled between data lines 505-1 (D) and 505-2 (D_). The equilibration circuitry 514 also comprises transistors 525-1 and 525-2 each having a first source/drain region coupled to an equilibration voltage (e.g., $V_{DD}/2$), where $V_{DD}$ is a supply voltage associated with the array. A second source/drain region of transistor 525-1 can be coupled data line 505-1 (D), and a second source/drain region of transistor 525-2 can be coupled data line 505-2 (D_). Gates of transistors 524, 525-1, and 525-2 can be coupled together, and to an equilibration (EQ) control signal line 526. As such, activating EQ enables the transistors 524, 525-1, and 525-2, which effectively shorts data lines 505-1 (D) and 505-2 (D_) together and to the an equilibration voltage (e.g., $V_{DD}/2$).

Although FIG. 5 shows sense amplifier 506 comprising the equilibration circuitry 514, embodiments are not so limited, and the equilibration circuitry 514 may be implemented discretely from the sense amplifier 506, implemented in a different configuration than that shown in FIG. 5, or not implemented at all.

As described further below, in a number of embodiments, the sensing circuitry (e.g., sense amplifier 506 and compute component 531) can be operated to perform a selected logical operation and initially store the result in one of the sense amplifier 506 or the compute component 531 without transferring data from the sensing circuitry via an I/O line (e.g., without performing a data line address access via activation of a column decode signal, for instance).

Performance of logical operations (e.g., Boolean logical functions involving data values) is fundamental and commonly used. Boolean logical functions are used in many higher level functions. Consequently, speed and/or power efficiencies that can be realized with improved logical operations, which can translate into speed and/or power efficiencies of higher order functionalities. Described herein are apparatuses and methods for performing logical operations without transferring data via an input/output (I/O) line and/or without transferring data to a control component external to the array. Depending on memory array architecture, the apparatuses and methods for performing the logical operations may not require amplification of a sense line (e.g., data line, digit line, bit line) pair.

As shown in FIG. 5, the compute component 531 can also comprise a latch 564, which can be referred to herein as a secondary latch. The secondary latch 564 can be configured and operated in a manner similar to that described above with respect to the primary latch 515, with the exception that the pair of cross coupled p-channel transistors (e.g., PMOS transistors) comprising the secondary latch can have their respective sources coupled to a supply voltage 512-2 (e.g., VDD), and the pair of cross coupled n-channel transistors (e.g., NMOS transistors) of the secondary latch can have their respective sources selectively coupled to a reference voltage 512-1 (e.g., ground "GND"), such that the secondary latch is continuously enabled. The configuration of the compute component is not limited to that shown in FIG. 5 at 531, and various other embodiments are described further below.

Figure 6:
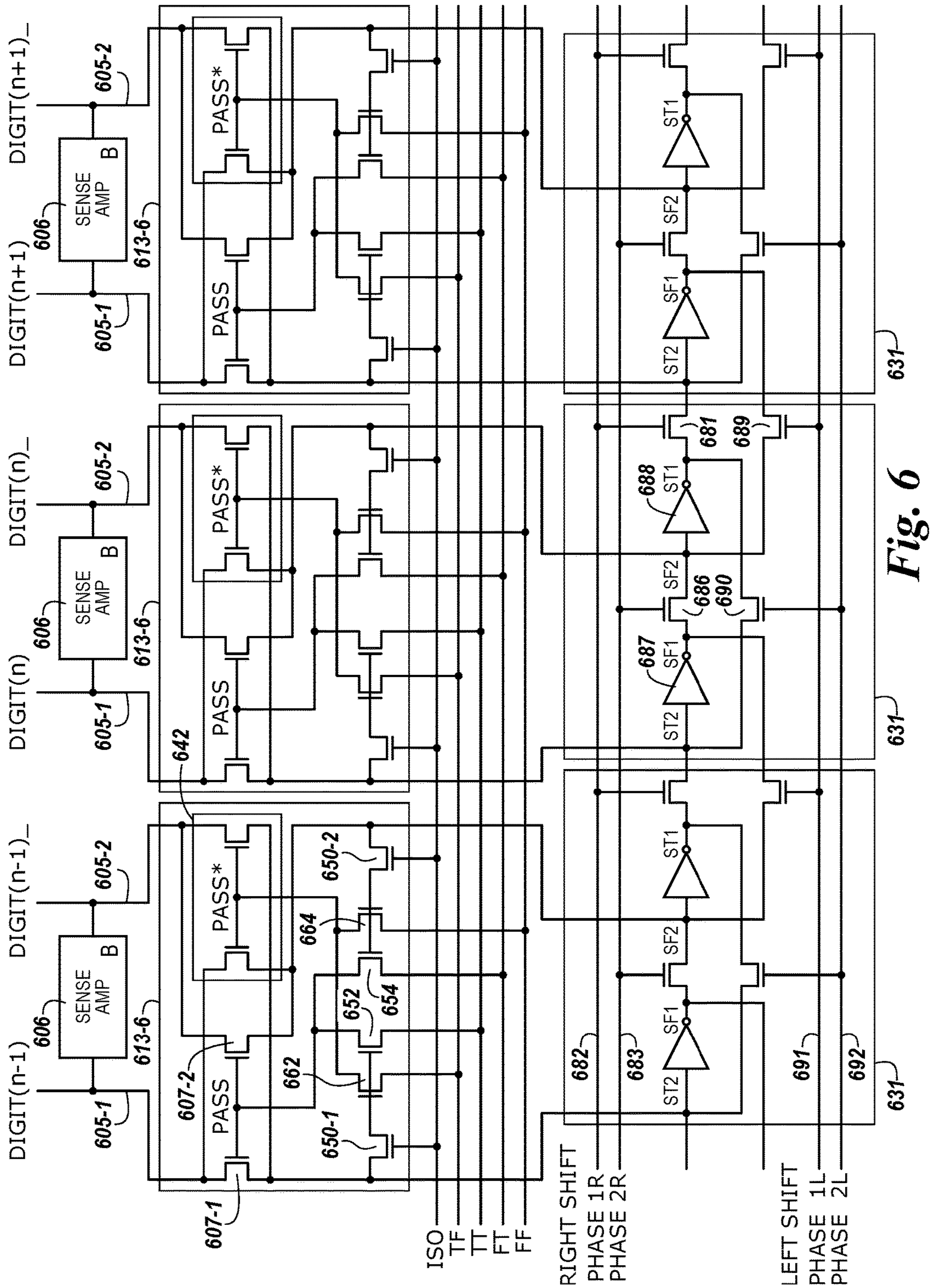
FIG. 6 is a schematic diagram illustrating sensing circuitry having selectable logical operation selection logic in accordance with embodiments of the present disclosure.

FIG. 6 is a schematic diagram illustrating sensing circuitry having selectable logical operation selection logic in accordance with a number of embodiments of the present disclosure. FIG. 6 shows a number of sense amplifiers 606 coupled to respective pairs of complementary sense lines 605-1 and 605-2, and a corresponding number of compute component 631 coupled to the sense amplifiers 606 via pass gates 607-1 and 607-2. The gates of the pass gates 607-1 and 607-2 can be controlled by a logical operation selection logic signal, PASS. For example, an output of the logical operation selection logic 613-6 can be coupled to the gates of the pass gates 607-1 and 607-2.

According to the embodiment illustrated in FIG. 6, the compute components 631 can comprise respective stages (e.g., shift cells) of a loadable shift register configured to shift data values left and right. According to some embodiments, the compute component 631 can have bidirectional shift capabilities. According to various embodiments of the present disclosure, the compute components 631 can comprise a loadable shift register (e.g., with each compute component 631 serving as a respective shift stage) configured to shift in multiple directions (e.g., right and left). According to various embodiments of the present disclosure, the compute components 631 can comprise respective stages (e.g., shift cells) of a loadable shift register configured to shift in one direction. The loadable shift register can be coupled to the pairs of complementary sense lines 605-1 and 605-2, with node ST2 of each stage being coupled to the sense line (e.g., DIGIT(n)) communicating a true data value and with node SF2 of each stage being coupled to the sense line (e.g., DIGIT(n)_) communicating a complementary (e.g., false) data value.

According to some embodiments and as illustrated in FIG. 6, each compute component 631 (e.g., stage) of the shift register comprises a pair of right-shift transistors 681 and 686, a pair of left-shift transistors 689 and 690, and a pair of inverters 687 and 688. The signals PHASE 1R, PHASE 2R, PHASE 1L, and PHASE 2L can be applied to respective control lines 682, 683, 691 and 692 to enable/disable feedback on the latches of the corresponding compute components 631 in association with performing logical operations and/or shifting data in accordance with embodiments described herein. Examples of shifting data (e.g., from a particular compute component 631 to an adjacent compute component 631) is described further below with respect to FIGS. 8 and 9.

The compute components 631 (e.g., stages) of the loadable shift register can comprise a first right-shift transistor 681 having a gate coupled to a first right-shift control line 680 (e.g., "PHASE 1R"), and a second right-shift transistor 686 having a gate coupled to a second right-shift control line 682 (e.g., "PHASE 2R"). Node ST2 of each stage of the loadable shift register is coupled to an input of a first inverter 687. The output of the first inverter 687 (e.g., node SF1) is coupled to one source/drain of the second right-shift transistor 686, and another source/drain of the second right-shift transistor 686 is coupled to an input of a second inverter 688 (e.g., node SF2). The output of the second inverter 688 (e.g., node ST1) is coupled to one source/drain of the first right-shift transistor 681, and another source/drain of the first right-shift transistor 681 is coupled to an input of a second inverter (e.g., node SF2) for an adjacent compute component 631. Latch transistor 685 has a gate coupled to a LATCH control signal 684. One source/drain of the latch transistor 685 is coupled to node ST2, and another source/drain of the latch transistor 685 is coupled to node ST1.

Sense amplifiers 606 can be coupled to respective pairs of complementary sense lines 605-1 and 605-2, and corresponding compute components 631 coupled to the sense amplifiers 606 via respective pass gates 607-1 and 607-2. The gates of the pass gates 607-1 and 607-2 can be controlled by respective logical operation selection logic signals, "Passd" and "Passdb," which can be output from logical operation selection logic (not shown for clarity).

A first left-shift transistor 689 is coupled between node SF2 of one loadable shift register to node SF1 of a loadable shift register corresponding to an adjacent compute component 631. The channel of second left-shift transistor 690 is coupled from node ST2 to node ST1. The gate of the first left-shift transistor 689 is coupled to a first left-shift control line 691 (e.g., "PHASE 1L"), and the gate of the second left-shift transistor 690 is coupled to a second left-shift control line 692 (e.g., "PHASE 2L").

Figure 8:
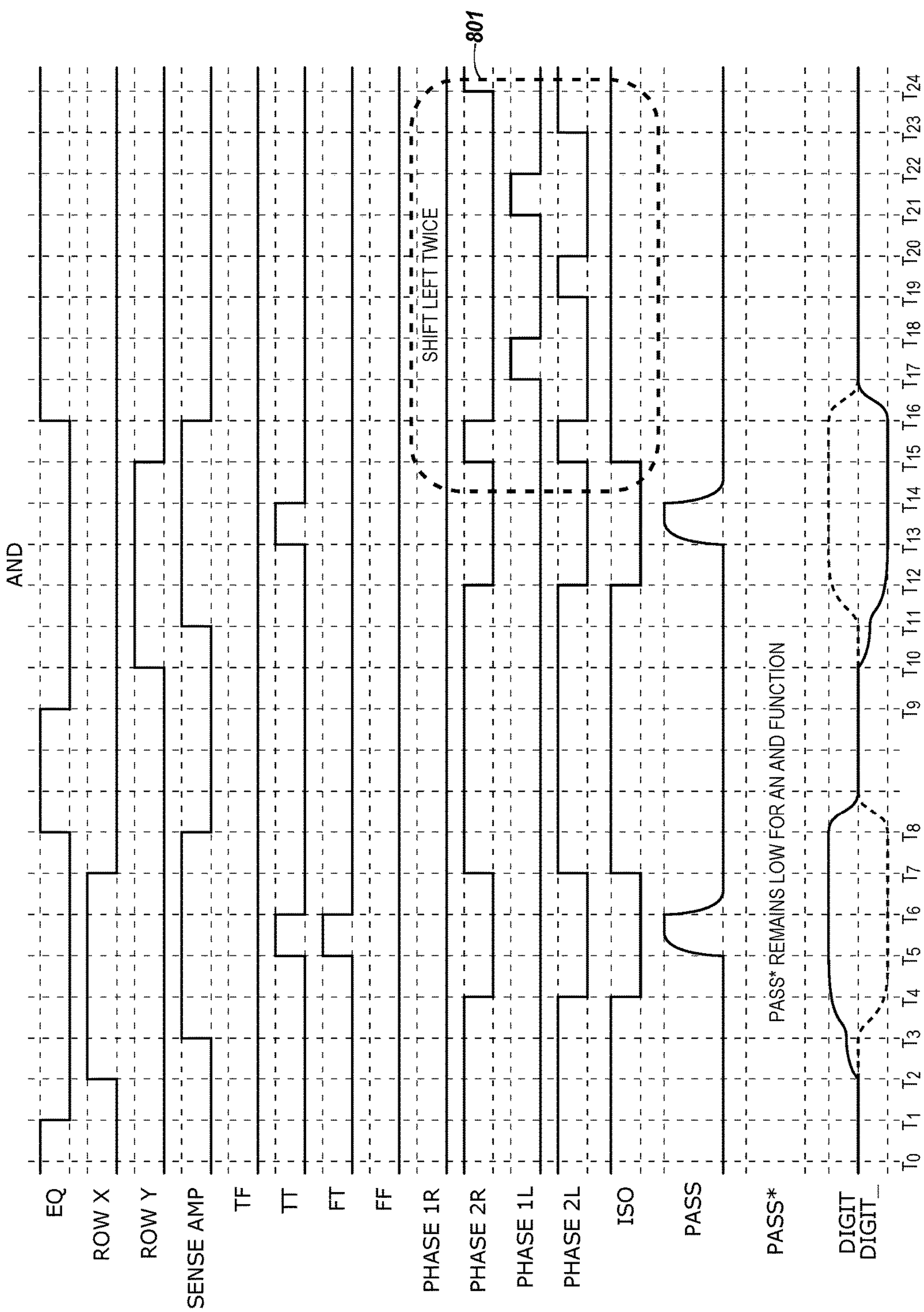
FIG. 8 illustrates a timing diagram associated with performing a logical operation and a shifting operation using the sensing circuitry in accordance with embodiments of the present disclosure.
Figure 9:
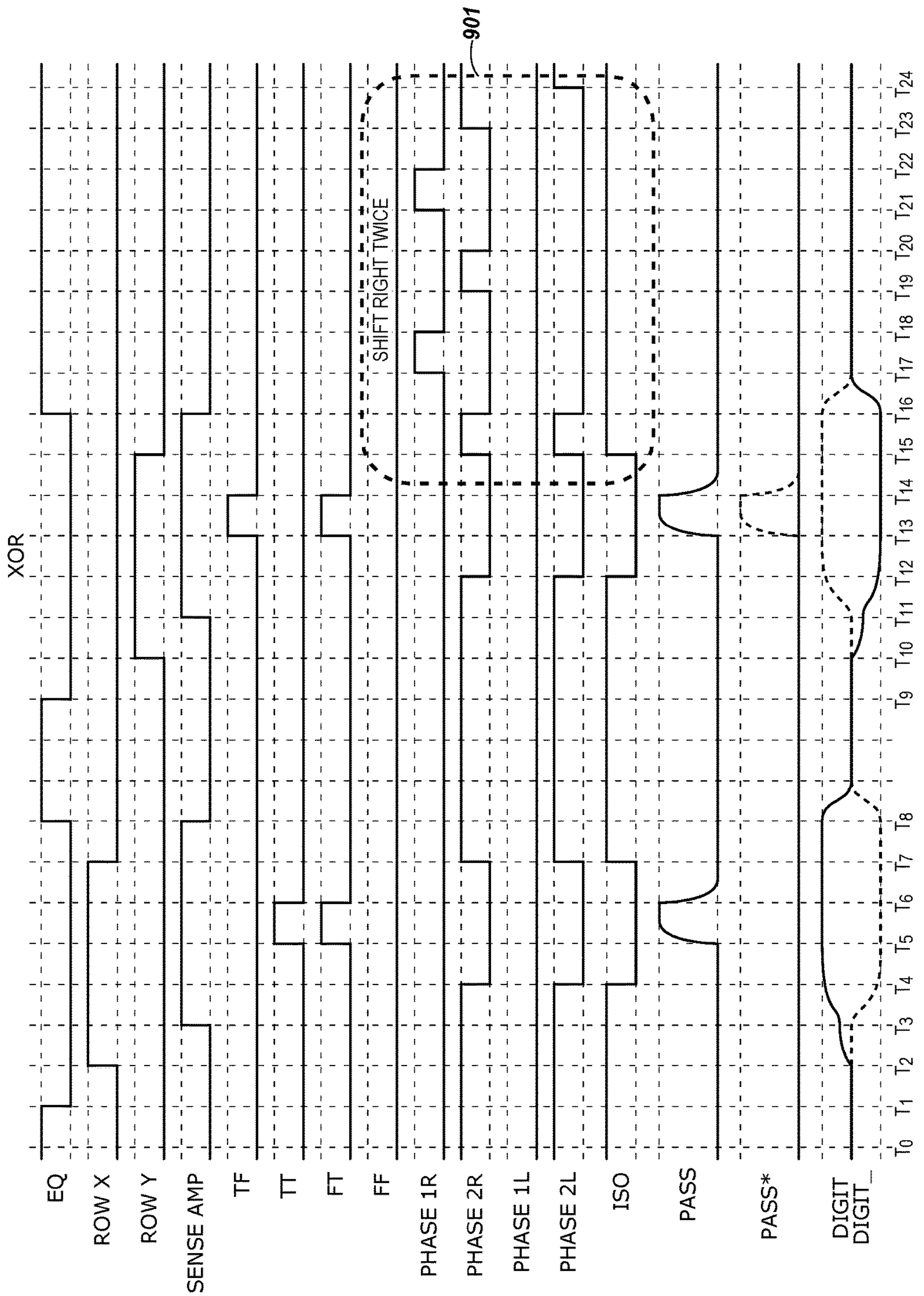
FIG. 9 illustrates a timing diagram associated with performing a logical operation and a shifting operation using the sensing circuitry in accordance with embodiments of the present disclosure.

The logical operation selection logic 613-6 includes the swap gates 642, as well as logic to control the pass gates 607-1 and 607-2 and the swap gates 642. The logical operation selection logic 613-6 includes four logic selection transistors: logic selection transistor 662 coupled between the gates of the swap transistors 642 and a TF signal control line, logic selection transistor 652 coupled between the gates of the pass gates 607-1 and 607-2 and a TT signal control line, logic selection transistor 654 coupled between the gates of the pass gates 607-1 and 607-2 and a FT signal control line, and logic selection transistor 664 coupled between the gates of the swap transistors 642 and a FF signal control line. Gates of logic selection transistors 662 and 652 are coupled to the true sense line through isolation transistor 650-1 (having a gate coupled to an ISO signal control line). Gates of logic selection transistors 664 and 654 are coupled to the complementary sense line through isolation transistor 650-2 (also having a gate coupled to an ISO signal control line). FIGS. 8 and 9 illustrate timing diagrams associated with performing logical operations and shifting operations using the sensing circuitry shown in FIG. 6.

Data values on the respective pairs of complementary sense lines 605-1 and 605-2 can be loaded into the corresponding compute components 631 (e.g., loadable shift register) by causing the pass gates 607-1 and 607-2 to conduct, such as by causing the Passd control signal to go high. Gates that are controlled to have continuity (e.g., electrical continuity through a channel) are conducting, and can be referred to herein as being OPEN. Gates that are controlled to not have continuity (e.g., electrical continuity through a channel) are said to be non-conducting, and can be referred to herein as being CLOSED. For instance, continuity refers to a low resistance condition in which a gate is conducting. The data values can be loaded into the respective compute components 631 by either the sense amplifier 606 overpowering the corresponding compute component 631 (e.g., to overwrite an existing data value in the compute component 631) and/or by turning off the PHASE 1R and PHASE 2R control signals 680 and 682 and the LATCH control signal 684. A first latch (e.g., sense amplifier) can be configured to overpower a second latch (e.g., compute component) when the current provided by the first latch and presented to the second latch is sufficient to flip the second latch.

The sense amplifier 606 can be configured to overpower the compute component 631 by driving the voltage on the pair of complementary sense lines 605-1 and 605-2 to the maximum power supply voltage corresponding to a data value (e.g., driving the pair of complementary sense lines 605-1 and 605-2 to the rails), which can change the data value stored in the compute component 631. According to a number of embodiments, the compute component 631 can be configured to communicate a data value to the pair of complementary sense lines 605-1 and 605-2 without driving the voltages of the pair of complementary sense lines 605-1 and 605-2 to the rails (e.g., to VDD or GND). As such, the compute component 631 can be configured to not overpower the sense amplifier 606 (e.g., the data values on the pair of complementary sense lines 605-1 and 605-2 from the compute component 631 will not change the data values stored in the sense amplifier 606 until the sense amplifier is enabled).

Once a data value is loaded into a compute component 631 of the loadable shift register, the true data value is separated from the complement data value by the first inverter 687. The data value can be shifted to the right (e.g., to an adjacent compute component 631) by alternate operation of first right-shift transistor 681 and second right-shift transistor 686, which can be accomplished when the first right-shift control line 680 and the second right-shift control line 682 have periodic signals that go high out-of-phase from one another (e.g., non-overlapping alternating square waves 180 degrees out of phase with one another). LATCH control signal 684 can be activated to cause latch transistor 685 to conduct, thereby latching the data value into a corresponding compute component 631 of the loadable shift register (e.g., while signal PHASE 1R remains low and PHASE 2R remains high to maintain the data value latched in the compute component 631).

FIG. 7 is a logic table illustrating selectable logic operation results implemented by a sensing circuitry (e.g., sensing circuitry 550 shown in FIG. 5) in accordance with a number of embodiments of the present disclosure. The four logic selection control signals (e.g., TF, TT, FT, and FF), in conjunction with a particular data value present on the complementary sense lines, can be used to select one of a plurality of logical operations to implement involving the starting data values stored in the sense amplifier 506 and compute component 531. The four control signals (e.g., TF, TT, FT, and FF), in conjunction with a particular data value present on the complementary sense lines (e.g., on nodes S and S*), controls the pass gates 607-1 and 607-2 and swap transistors 642, which in turn affects the data value in the compute component 631 and/or sense amplifier 606 before/after firing. The capability to selectably control the swap transistors 642 facilitates implementing logical operations involving inverse data values (e.g., inverse operands and/or inverse result), among others.

Logic Table 7-1 illustrated in FIG. 7 shows the starting data value stored in the compute component 531 shown in column A at 744, and the starting data value stored in the sense amplifier 506 shown in column B at 745. The other 3 column headings in Logic Table 7-1 refer to the state of the pass gates 507-1 and 507-2 and the swap transistors 542, which can respectively be controlled to be OPEN or CLOSED depending on the state of the four logic selection control signals (e.g., TF, TT, FT, and FF), in conjunction with a particular data value present on the pair of complementary sense lines 505-1 and 505-2 when the ISO control signal is asserted. The "NOT OPEN" column 756 corresponds to the pass gates 507-1 and 507-2 and the swap transistors 542 both being in a non-conducting condition, the "OPEN TRUE" column 770 corresponds to the pass gates 507-1 and 507-2 being in a conducting condition, and the "OPEN INVERT" column 771 corresponds to the swap transistors 542 being in a conducting condition. The configuration corresponding to the pass gates 507-1 and 507-2 and the swap transistors 542 both being in a conducting condition is not reflected in Logic Table 7-1 since this results in the sense lines being shorted together.

Via selective control of the pass gates 507-1 and 507-2 and the swap transistors 542, each of the three columns of the upper portion of Logic Table 7-1 can be combined with each of the three columns of the lower portion of Logic Table 7-1 to provide nine (e.g., 3×3) different result combinations, corresponding to nine different logical operations, as indicated by the various connecting paths shown at 775. The nine different selectable logical operations that can be implemented by the sensing circuitry 550 are summarized in Logic Table 7-2.

The columns of Logic Table 7-2 show a heading 780 that includes the states of logic selection control signals (e.g., FF, FT, TF, TT). For example, the state of a first logic selection control signal (e.g., FF) is provided in row 776, the state of a second logic selection control signal (e.g., FT) is provided in row 777, the state of a third logic selection control signal (e.g., TF) is provided in row 778, and the state of a fourth logic selection control signal (e.g., TT) is provided in row 779. The particular logical operation corresponding to the results is summarized in row 747.

FIG. 8 illustrates a timing diagram associated with performing a logical AND operation and a shifting operation using the sensing circuitry in accordance with a number of embodiments of the present disclosure. FIG. 8 includes waveforms corresponding to signals EQ, ROW X, ROW Y, SENSE AMP, TF, TT, FT, FF, PHASE 1R, PHASE 2R, PHASE 1L, PHASE 2L, ISO, Pass, Pass*, DIGIT, and DIGIT_. The EQ signal corresponds to an equilibrate signal associated with a sense amplifier (e.g., EQ 226 shown in FIG. 5). The ROW X and ROW Y signals correspond to signals applied to respective access line (e.g., access lines 504-X and 504-Y shown in FIG. 5) to access a selected cell (or row of cells). The SENSE AMP signal corresponds to a signal used to enable/disable a sense amplifier (e.g., sense amplifier 606). The TF, TT, FT, and FF signals correspond to logic selection control signals such as those shown in FIG. 6 (e.g., signals coupled to logic selection transistors 662, 652, 654, and 664). The PHASE 1R, PHASE 2R, PHASE 1L, and PHASE 2L signals correspond to the control signals (e.g., clock signals) provided to respective control lines 682, 683, 691 and 692 shown in FIG. 6. The ISO signal corresponds to the signal coupled to the gates of the isolation transistors 650-1 and 650-2 shown in FIG. 6. The PASS signal corresponds to the signal coupled to the gates of pass transistors 607-1 and 607-2 shown in FIG. 6, and the PASS* signal corresponds to the signal coupled to the gates of the swap transistors 642. The DIGIT and DIGIT_signals correspond to the signals present on the respective sense lines 605-1 (e.g., DIGIT (n)) and 605-2 (e.g., DIGIT (n)_).

The timing diagram shown in FIG. 8 is associated with performing a logical AND operation on a data value stored in a first memory cell and a data value stored in a second memory cell of an array. The memory cells can correspond to a particular column of an array (e.g., a column comprising a complementary pair of sense lines) and can be coupled to respective access lines (e.g., ROW X and ROW Y). In describing the logical AND operation shown in FIG. 8, reference will be made to the sensing circuitry described in FIG. 5. For example, the logical operation described in FIG. 8 can include storing the data value of the ROW X memory cell (e.g., the "ROW X data value) in the latch of the corresponding compute component 631 (e.g., the "A" data value), which can be referred to as the accumulator 631, storing the data value of the ROW Y memory cell (e.g., the "ROW Y data value") in the latch of the corresponding sense amplifier 606 (e.g., the "B" data value), and performing a selected logical operation (e.g., a logical AND operation in this example) on the ROW X data value and the ROW Y data value, with the result of the selected logical operation being stored in the latch of the compute component 631.

As shown in FIG. 8, at time $T_1$, equilibration of the sense amplifier 606 is disabled (e.g., EQ goes low). At time $T_2$, ROW X goes high to access (e.g., select) the ROW X memory cell. At time $T_3$, the sense amplifier 606 is enabled (e.g., SENSE AMP goes high), which drives the complementary sense lines 605-1 and 605-2 to the appropriate rail voltages (e.g., VDD and GND) responsive to the ROW X data value (e.g., as shown by the DIGIT and DIGIT_signals), and the ROW X data value is latched in the sense amplifier 606. At time $T_4$, the PHASE 2R and PHASE 2L signals go low, which disables feedback on the latch of the compute component 631 (e.g., by turning off transistors 686 and 690, respectively) such that the value stored in the compute component may be overwritten during the logical operation. Also, at time $T_4$, ISO goes low, which disables isolation transistors 650-1 and 650-2. At time $T_5$, TT and FT are enabled (e.g., go high), which results in PASS going high (e.g., since either transistor 652 or 654 will conduct depending on which of node ST2 (corresponding to node "S" in FIG. 5) or node SF2 (corresponding to node "S*" in FIG. 5) was high when ISO was disabled at time $T_4$ (recall that when ISO is disabled, the voltages of the nodes ST2 and SF2 reside dynamically on the gates of the respective enable transistors 652 and 654). PASS going high enables the pass transistors 607-1 and 607-2 such that the DIGIT and DIGIT_signals, which correspond to the ROW X data value, are provided to the respective compute component nodes ST2 and SF2. At time $T_6$, TT and FT are disabled, which results in PASS going low, which disables the pass transistors 607-1 and 607-2. It is noted that PASS* remains low between time $T_5$ and $T_6$ since the TF and FF signals remain low. At time $T_7$, ROW X is disabled, and PHASE 2R, PHASE 2L, and ISO are enabled. Enabling PHASE 2R and PHASE 2L at time $T_7$ enables feedback on the latch of the compute component 631 such that the ROW X data value is latched therein. Enabling ISO at time $T_7$ again couples nodes ST2 and SF2 to the gates of the enable transistors 652, 654, 662, and 664. At time $T_8$, equilibration is enabled (e.g., EQ goes high such that DIGIT and DIGIT_are driven to an equilibrate voltage such as $V_{DD}/2$) and the sense amplifier 606 is disabled (e.g., SENSE AMP goes low).

With the ROW X data value latched in the compute component 631, equilibration is disabled (e.g., EQ goes low at time $T_9$). At time $T_{10}$, ROW Y goes high to access (e.g., select) the ROW Y memory cell. At time $T_{11}$, the sense amplifier 606 is enabled (e.g., SENSE AMP goes high), which drives the complementary sense lines 605-1 and 605-2 to the appropriate rail voltages (e.g., VDD and GND) responsive to the ROW Y data value (e.g., as shown by the DIGIT and DIGIT_signals), and the ROW Y data value is latched in the sense amplifier 606. At time $T_{12}$, the PHASE 2R and PHASE 2L signals go low, which disables feedback on the latch of the compute component 631 (e.g., by turning off transistors 686 and 690, respectively) such that the value stored in the compute component may be overwritten during the logical operation. Also, at time $T_{12}$, ISO goes low, which disables isolation transistors 650-1 and 650-2. Since the desired logical operation in this example is an AND operation, at time $T_{13}$, TT is enabled while TF, FT and FF remain disabled (as shown in TABLE 7-2, FF=0, FT=0, TF=0, and TT=1 corresponds to a logical AND operation). Whether enabling TT results in PASS going high depends on the value stored in the compute component 631 when ISO is disabled at time $T_{12}$. For example, enable transistor 652 will conduct if node ST2 was high when ISO is disabled, and enable transistor will not conduct if node ST2 was low when ISO was disabled at time $T_{12}$.

In this example, if PASS goes high at time $T_{13}$, the pass transistors 607-1 and 607-2 are enabled such that the DIGIT and DIGIT_signals, which correspond to the ROW Y data value, are provided to the respective compute component nodes ST2 and SF2. As such, the value stored in the compute component 631 (e.g., the ROW X data value) may be flipped, depending on the value of DIGIT and DIGIT_(e.g., the ROW Y data value). In this example, if PASS stays low at time $T_{13}$, the pass transistors 607-1 and 607-2 are not enabled such that the DIGIT and DIGIT_signals, which correspond to the ROW Y data value, remain isolated from the nodes ST2 and SF2 of the compute component 631. As such, the data value in the compute component (e.g., the ROW X data value) would remain the same.

At time $T_{14}$, TT is disabled, which results in PASS going (or remaining) low, such that the pass transistors 607-1 and 607-2 are disabled. It is noted that PASS* remains low between time $T_{13}$ and $T_{14}$ since the TF and FF signals remain low. At time $T_{15}$, ROW Y is disabled, and PHASE 2R, PHASE 2L, and ISO are enabled. Enabling PHASE 2R and PHASE 2L at time Tis enables feedback on the latch of the compute component 631 such that the result of the AND operation (e.g., "A" AND "B") is latched therein. Enabling ISO at time $T_{15}$ again couples nodes ST2 and SF2 to the gates of the enable transistors 652, 654, 662, and 664. At time $T_{16}$, equilibration is enabled (e.g., EQ goes high such that DIGIT and DIGIT_are driven to an equilibrate voltage) and the sense amplifier 606 is disabled (e.g., SENSE AMP goes low).

The result of the AND operation, which is initially stored in the compute component 631 in this example, can be transferred back to the memory array (e.g., to a memory cell coupled to ROW X, ROW Y, and/or a different row via the complementary sense lines) and/or to an external location (e.g., an external processing component) via I/O lines.

FIG. 8 also includes (e.g., at 801) signaling associated with shifting data (e.g., from a compute component 631 to an adjacent compute component 631). The example shown in FIG. 8 illustrates two left shifts such that a data value stored in a compute component corresponding to column "N" is shifted left to a compute component corresponding to column "N−2". As shown at time $T_{16}$, PHASE 2R and PHASE 2L are disabled, which disables feedback on the compute component latches, as described above. To perform a first left shift, PHASE 1L is enabled at time $T_{17}$ and disabled at time $T_{18}$. Enabling PHASE 1L causes transistor 689 to conduct, which causes the data value at node SF1 to move left to node SF2 of a left-adjacent compute component 631. PHASE 2L is subsequently enabled at time $T_{19}$ and disabled at time $T_{20}$. Enabling PHASE 2L causes transistor 690 to conduct, which causes the data value from node ST1 to move left to node ST2 completing a left shift.

The above sequence (e.g., enabling/disabling PHASE 1L and subsequently enabling/disabling PHASE 2L) can be repeated to achieve a desired number of left shifts. For instance, in this example, a second left shift is performed by enabling PHASE 1L at time $T_{21}$ and disabling PHASE 1L at time $T_{22}$. PHASE 2L is subsequently enabled at time $T_{23}$ to complete the second left shift. Subsequent to the second left shift, PHASE 2L remains enabled and PHASE 2R is enabled (e.g., at time $T_{24}$) such that feedback is enabled to latch the data values in the compute component latches.

FIG. 9 illustrates a timing diagram associated with performing a logical XOR operation and a shifting operation using the sensing circuitry in accordance with a number of embodiments of the present disclosure. FIG. 9 includes the same waveforms described in FIG. 8 above. However, the timing diagram shown in FIG. 9 is associated with performing a logical XOR operation on a ROW X data value and a ROW Y data value (e.g., as opposed to a logical AND operation). Reference will again be made to the sensing circuitry described in FIG. 6.

The signaling indicated at times $T_0$ through $T_9$ for FIG. 9 are the same as for FIG. 8 and will not be repeated here. As such, at time $T_9$, EQ is disabled with the ROW X data value being latched in the compute component 631. At time $T_{10}$, ROW Y goes high to access (e.g., select) the ROW Y memory cell. At time $T_{11}$, the sense amplifier 606 is enabled (e.g., SENSE AMP goes high), which drives the complementary sense lines 605-1 and 605-2 to the appropriate rail voltages (e.g., $V_{DD}$ and GND) responsive to the ROW Y data value (e.g., as shown by the DIGIT and DIGIT_signals), and the ROW Y data value is latched in the sense amplifier 606. At time $T_{12}$, the PHASE 2R and PHASE 2L signals go low, which disables feedback on the latch of the compute component 531 (e.g., by turning off transistors 686 and 690, respectively) such that the value stored in the compute component 631 may be overwritten during the logical operation. Also, at time $T_{12}$, ISO goes low, which disables isolation transistors 650-1 and 650-2. Since the desired logical operation in this example is an XOR operation, at time $T_{13}$, TF and FT are enabled while TT and FF remain disabled (as shown in TABLE 7-2, FF=0, FT=1, TF=1, and TT=0 corresponds to a logical XOR (e.g., "AXB") operation). Whether enabling TF and FT results in PASS or PASS* going high depends on the value stored in the compute component 631 when ISO is disabled at time $T_{12}$. For example, enable transistor 662 will conduct if node ST2 was high when ISO is disabled, and enable transistor 662 will not conduct if node ST2 was low when ISO was disabled at time $T_{12}$. Similarly, enable transistor 654 will conduct if node SF2 was high when ISO is disabled, and enable transistor 654 will not conduct if node SF2 was low when ISO is disabled.

In this example, if PASS goes high at time $T_{13}$, the pass transistors 607-1 and 607-2 are enabled such that the DIGIT and DIGIT_signals, which correspond to the ROW Y data value, are provided to the respective compute component nodes ST2 and SF2. As such, the value stored in the compute component 631 (e.g., the ROW X data value) may be flipped, depending on the value of DIGIT and DIGIT_(e.g., the ROW Y data value). In this example, if PASS stays low at time $T_{13}$, the pass transistors 607-1 and 607-2 are not enabled such that the DIGIT and DIGIT_signals, which correspond to the ROW Y data value, remain isolated from the nodes ST2 and SF2 of the compute component 631. As such, the data value in the compute component (e.g., the ROW X data value) would remain the same. In this example, if PASS* goes high at time $T_{13}$, the swap transistors 642 are enabled such that the DIGIT and DIGIT_signals, which correspond to the ROW Y data value, are provided to the respective compute component nodes ST2 and SF2 in a transposed manner (e.g., the "true" data value on DIGIT(n) would be provided to node SF2 and the "complement" data value on DIGIT(n)_would be provided to node ST2). As such, the value stored in the compute component 631 (e.g., the ROW X data value) may be flipped, depending on the value of DIGIT and DIGIT_(e.g., the ROW Y data value). In this example, if PASS* stays low at time $T_{13}$, the swap transistors 642 are not enabled such that the DIGIT and DIGIT_signals, which correspond to the ROW Y data value, remain isolated from the nodes ST2 and SF2 of the compute component 631. As such, the data value in the compute component (e.g., the ROW X data value) would remain the same.

At time $T_{14}$, TF and FT are disabled, which results in PASS and PASS* going (or remaining) low, such that the pass transistors 607-1 and 607-2 and swap transistors 642 are disabled. At time $T_{15}$, ROW Y is disabled, and PHASE 2R, PHASE 2L, and ISO are enabled. Enabling PHASE 2R and PHASE 2L at time Tis enables feedback on the latch of the compute component 631 such that the result of the XOR operation (e.g., "A" XOR "B") is latched therein. Enabling ISO at time $T_{15}$ again couples nodes ST2 and SF2 to the gates of the enable transistors 652, 654, 662, and 664. At time $T_{16}$, equilibration is enabled (e.g., EQ goes high such that DIGIT and DIGIT_are driven to an equilibrate voltage) and the sense amplifier 606 is disabled (e.g., SENSE AMP goes low).

The result of the XOR operation, which is initially stored in the compute component 631 in this example, can be transferred back to the memory array (e.g., to a memory cell coupled to ROW X, ROW Y, and/or a different row via the complementary sense lines) and/or to an external location (e.g., an external processing component) via I/O lines.

FIG. 9 also includes (e.g., at 901) signaling associated with shifting data (e.g., from a compute component 631 to an adjacent compute component 631). The example shown in FIG. 9 illustrates two right shifts such that a data value stored in a compute component corresponding to column "N" is shifted right to a compute component corresponding to column "N+2". As shown at time $T_{16}$, PHASE 2R and PHASE 2L are disabled, which disables feedback on the compute component latches, as described above. To perform a first right shift, PHASE 1R is enabled at time $T_{17}$ and disabled at time $T_{18}$. Enabling PHASE 1R causes transistor 681 to conduct, which causes the data value at node ST1 to move right to node ST2 of a right-adjacent compute component 631. PHASE 2R is subsequently enabled at time $T_{19}$ and disabled at time $T_{20}$. Enabling PHASE 2R causes transistor 686 to conduct, which causes the data value from node SF1 to move right to node SF2 completing a right shift.

The above sequence (e.g., enabling/disabling PHASE 1R and subsequently enabling/disabling PHASE 2R) can be repeated to achieve a desired number of right shifts. For instance, in this example, a second right shift is performed by enabling PHASE 1R at time $T_{21}$ and disabling PHASE 1R at time $T_{22}$. PHASE 2R is subsequently enabled at time $T_{23}$ to complete the second right shift. Subsequent to the second right shift, PHASE 1R remains disabled, PHASE 2R remains enabled, and PHASE 2L is enabled (e.g., at time $T_{24}$) such that feedback is enabled to latch the data values in the compute component latches.

Although the examples described in FIGS. 8 and 9 include the logical operation result being stored in the compute component (e.g., 631), sensing circuitry in accordance with embodiments described herein can be operated to perform logical operations with the result being initially stored in the sense amplifier (e.g., as illustrated in FIG. 8). Also, embodiments are not limited to the "AND" and "XOR" logical operation examples described in FIGS. 8 and 9, respectively. For example, sensing circuitry in accordance with embodiments of the present disclosure (e.g., 650 shown in FIG. 6) can be controlled to perform various other logical operations such as those shown in Table 7-2.

While example embodiments including various combinations and configurations of sensing circuitry, sense amps, compute components, dynamic latches, isolation devices, and/or shift circuitry have been illustrated and described herein, embodiments of the present disclosure are not limited to those combinations explicitly recited herein. Other combinations and configurations of the sensing circuitry, sense amps, compute component, dynamic latches, isolation devices, and/or shift circuitry disclosed herein are expressly included within the scope of this disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

an array comprising memory cells arranged in rows coupled by access lines and columns coupled by sense lines;

sensing circuitry coupled to the array and comprising: sense amplifiers each corresponding to different sense lines; and compute components each corresponding to the different sense lines; and a memory controller coupled to the array, wherein the memory controller is configured to operate the sensing circuitry to:

cause storing of a page table in the array;

determine, in the array and without sending data outside the array, a physical address of a portion of data by accessing the page table; and cause storing of the portion of data in a buffer.

2. The apparatus of claim 1, wherein the buffer is a translation lookaside buffer (TLB).

3. The apparatus of claim 1, wherein the controller configured to operate the sensing circuitry to determine the physical address comprises the controller configured to cause a page walk through the page table in the array independent of receiving intermediate instructions to perform the page table walk from a host.

4. The apparatus of claim 3, wherein the controller configured to cause storing of the page table in the array comprises the controller configured to cause storing of a series of descriptors with tiered levels that indicate a location of the portion of data.

5. The apparatus of claim 4, wherein each of the tiered levels is a pointer to a sub-section of a subsequent next level of the tiered levels.

6. The apparatus of claim 5, wherein a final tiered level of the tiered levels indicates the physical address of the portion of data.

7. The apparatus of claim 1, wherein the array of memory cells is configured to store the page table rather than a main memory associated with the array of memory cells.

8. A method, comprising:

searching for a physical address corresponding to a virtual address in a lookaside translation buffer (TLB);

determining that the virtual address is not located in the TLB;

performing a page table walk in a memory array comprising memory cells arranged in rows coupled by access lines and columns coupled by sense lines, wherein the page table walk is performed:

independent of intermediate page table walk instructions from a host and without sending data outside the memory array; and by performing each of a number of logical operations using compute components of sensing circuitry of the memory array on a sense line by sense line bases, wherein the compute components correspond to different respective sense lines; and locating the physical address based on the page table walk.

9. The method of claim 8, wherein performing the page table walk comprises resolving a first level of the page table to determine a location in a second level of the page table.

10. The method of claim 9, comprising resolving the second level to determine a location in a third level of the page table.

11. The method of claim 10, comprising resolving the third level of the page table to determine a location in a fourth level of the page table.

12. The method of claim 11, comprising resolving the fourth level of the page table to determine the physical address corresponding to the virtual address.

13. The method of claim 8, wherein, in response to determining the physical address, sending the portion of data located at the physical address to be stored in the TLB.

14. The method of claim 8, wherein performing the page table walk comprises comparing the virtual address with each of a plurality of elements of the page table simultaneously.

15. The method of claim 14, wherein comparing the virtual address with each of the plurality of elements comprises comparing the virtual address with a first of the plurality of elements using a plurality of first sensing components.

16. The method of claim 15, wherein the plurality of first sensing components used is a quantity that corresponds to a length of the virtual address and the first of the plurality of elements.

17. The method of claim 15, wherein comparing the virtual address with each of the plurality of elements comprises comparing the virtual address with a second of the plurality of elements using a plurality of second sensing components simultaneously with comparing the virtual address with the first of the plurality of elements.

18. The method of claim 17, wherein, the method includes using the memory array and the sensing circuitry as a fully associative cache to locate the physical address while simultaneously resolving levels of a page table.

19. An apparatus, comprising:

an array of memory cells configured to store a page table and arranged in rows coupled by access lines and columns coupled by sense lines;

sensing circuitry coupled to the array and comprising: sense amplifiers each corresponding to different sense lines; and compute components each corresponding to the different sense lines; and a controller coupled to the array, wherein the controller is configured to operate the sensing circuitry to:

search for an address in a translation lookaside buffer (TLB), wherein the address is associated with a portion of data;

in response to the address being absent from the TLB, perform a walk through the page table without sending data outside the array;

determine a physical address of the portion of data based on the page table walk; and cause storing of the portion of data in the TLB.

20. The apparatus of claim 19, wherein the array of memory cells and the sensing circuitry are configured to be a fully associative cache to determine the physical address.

21. The apparatus of claim 19, wherein the controller is configured to, in response to the portion of data not being in the array of memory cells, indicate to a host to locate the portion of data in an additional memory location.

22. A method, comprising:

performing a page table walk on a page table stored in a memory array to determine a physical address associated with a portion of data in response to determining that a virtual address associated with the portion of data is not located in a translation lookaside buffer (TLB), wherein the memory array comprises memory cells arranged in rows coupled by access lines and columns coupled by sense lines;

wherein performing the page table walk comprises:

resolving page table levels simultaneously:

using compute components of the sensing circuitry to perform each of a number of logical operations on a sense line by sense line bases, wherein the compute components correspond to different respective sense lines; and without sending data outside the memory array.

23. The method of claim 22, wherein resolving the page table levels simultaneously using the sensing circuitry comprises comparing the virtual address to each of a plurality of elements in the page table.

24. The method of claim 23, wherein, while comparing the virtual address to each of the plurality of elements, the page table stored in the memory array is used as a fully associative cache.

* * * * *